United States Patent [19]
Yamaura et al.

[11] Patent Number: 5,696,957
[45] Date of Patent: Dec. 9, 1997

[54] INTEGRATED CIRCUIT COMPRISING A CENTRAL PROCESSING UNIT FOR EXECUTING A PLURALITY OF PROGRAMS

[75] Inventors: Shinichi Yamaura, Takarazuka; Kazuhiko Hara, Takatsuki; Keiichi Yoshioka, Sanda; Takashi Yasui, Toyonaka, all of Japan

[73] Assignee: Ricoh Company, Ltd, Tokyo, Japan

[21] Appl. No.: 593,482

[22] Filed: Jan. 29, 1996

Related U.S. Application Data

[63] Continuation of Ser. No. 883,775, May 15, 1992, abandoned.

[30] Foreign Application Priority Data

| May 17, 1991 | [JP] | Japan | 3-113045 |
| May 17, 1991 | [JP] | Japan | 3-113046 |
| May 17, 1991 | [JP] | Japan | 3-113047 |
| Jan. 23, 1992 | [JP] | Japan | 4-010080 |

[51] Int. Cl.$^6$ .................................................. G06F 9/46
[52] U.S. Cl. ............................................ 395/569; 395/378
[58] Field of Search ............................ 395/460, 477, 395/481, 494, 495, 378, 569, 800, 250

[56] References Cited

U.S. PATENT DOCUMENTS

| 4,334,269 | 6/1982 | Shibasaki et al. | 395/378 |
| 4,777,588 | 10/1988 | Case et al. | 395/800 |
| 4,862,346 | 8/1989 | Wagner et al. | 395/400 |
| 4,893,279 | 1/1990 | Rahman et al. | 395/425 |
| 4,980,819 | 12/1990 | Cushing et al. | 395/550 |
| 5,109,524 | 4/1992 | Wagner et al. | 395/800 |
| 5,226,142 | 7/1993 | Vegesna et al. | 395/425 |
| 5,276,837 | 1/1994 | Sakaue | 395/425 |
| 5,301,340 | 4/1994 | Cook | 395/425 |

OTHER PUBLICATIONS

Maejima, et al., A 16–Bit Microprocessor with Multi-Register Bank Architecture, 1986 Proceedings Fall Joint Computer Conference, pp. 1014–1019.

*Primary Examiner*—David L. Robertson
*Attorney, Agent, or Firm*—Cooper & Dunham LLP

[57] ABSTRACT

An integrated circuit has a central processing unit for executing programs. The integrated circuit includes a register set, provided in the central processing unit, for storing crate required for executing a program in the central processing unit; and a register-file RAM, coupled to the central processing unit, for storing at least the same data as that stored in the register set in the central processing unit, wherein data stored in the register-file RAM can be supplied to the register set in the central processing unit.

30 Claims, 16 Drawing Sheets

F I G. 8
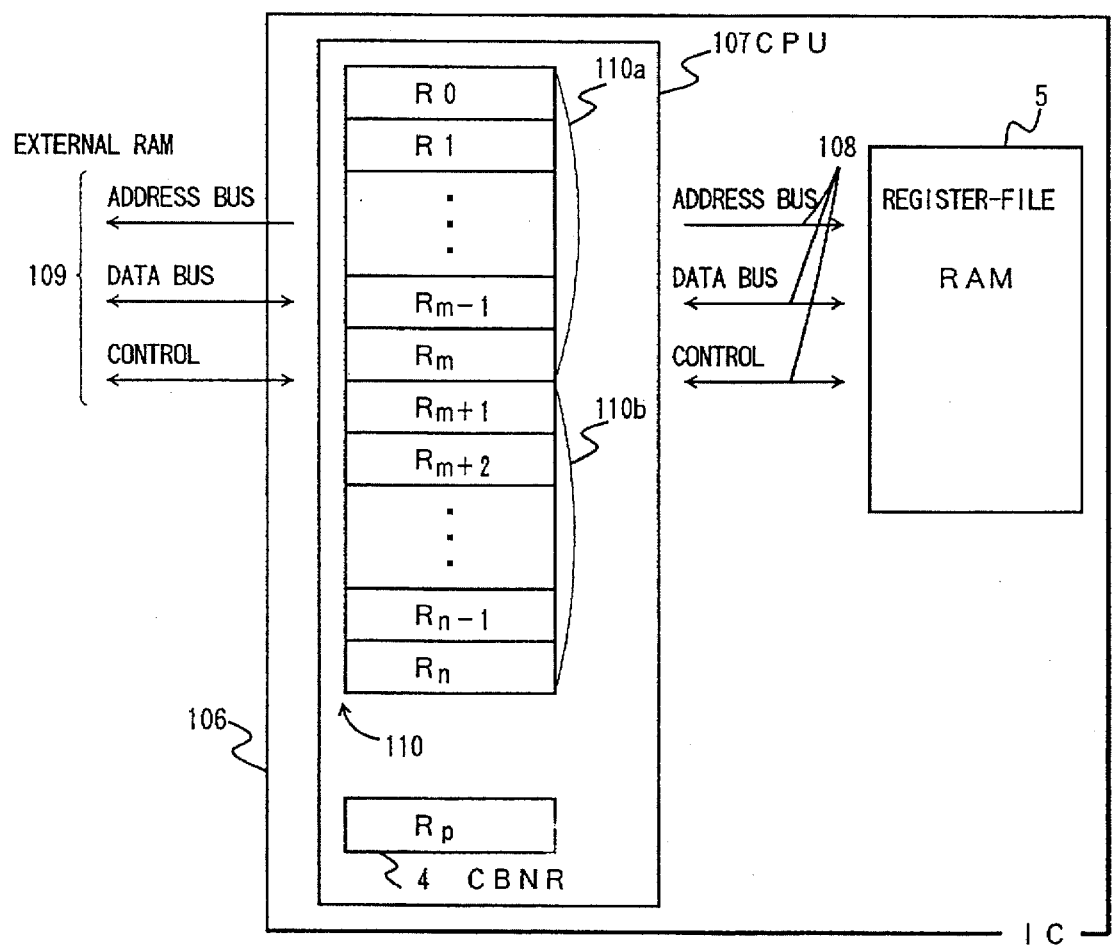

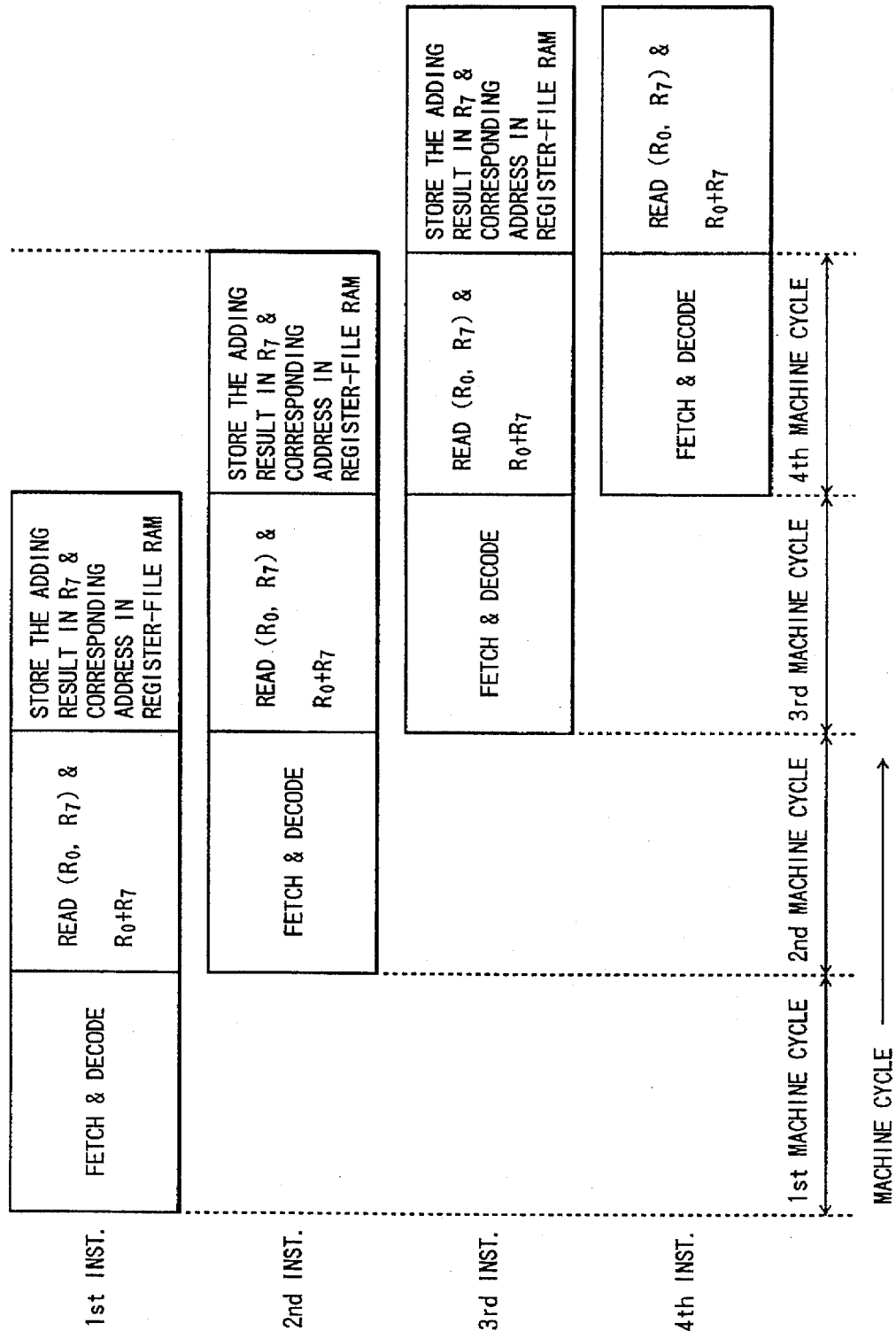

F I G. 1 4
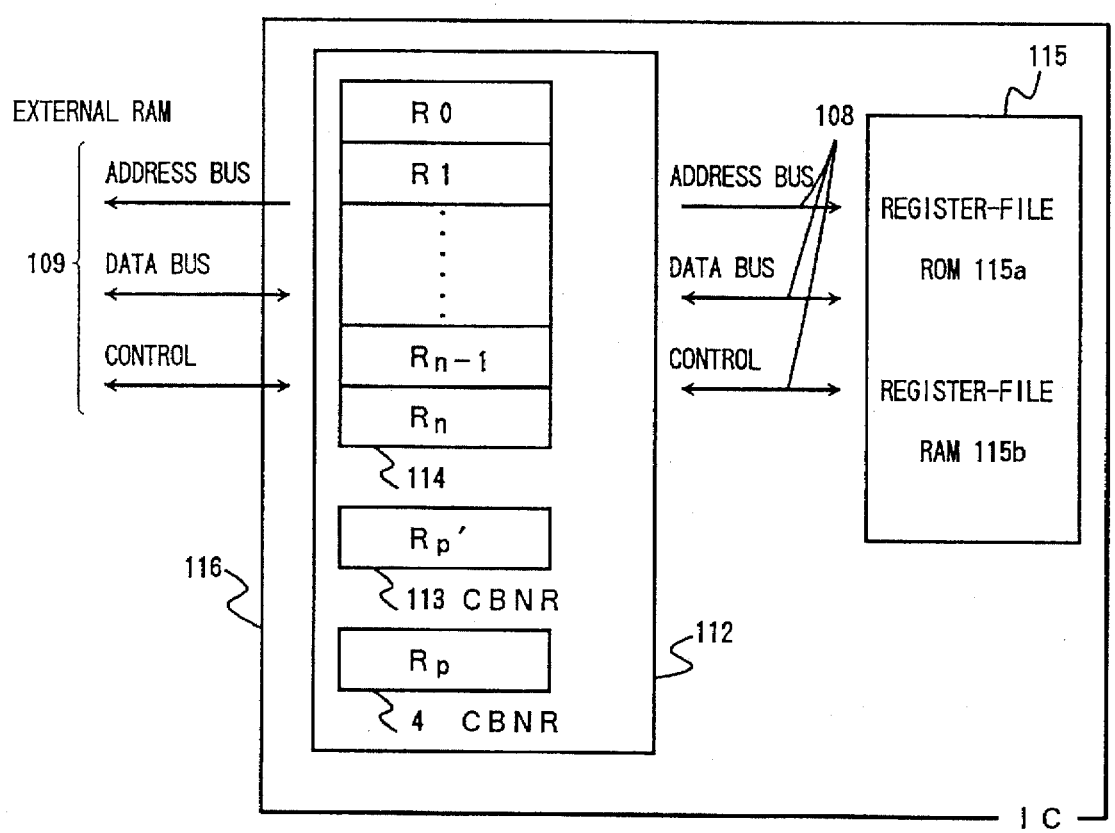

INTEGRATED CIRCUIT COMPRISING A CENTRAL PROCESSING UNIT FOR EXECUTING A PLURALITY OF PROGRAMS

This is a continuation of application Ser. No. 07/883,775 filed May 15, 1992, now abandoned.

BACKGROUND OF THE INVENTION (1) Field of the Invention

The present invention generally relates to an integrated circuit including a central processing unit (CPU).

(2) Description of Related Art

A central processing unit (hereinafter simply referred to as CPU) can generally execute a plurality of software items (hereinafter referred to as programs). The CPU has a general-purpose register-set formed of a plurality of registers. Data, such as arithmetic data and address pointing data, to be stored in the general-purpose register-set in respective programs differ from each other. Thus, in a case where the CPU executes a plurality of programs, data stored in the general-purpose register-set must be replaced each time a program is changed.

Data stored in the general-purpose register-set is replaced as shown in FIGS. 1A and 1B. When a program to be executed by a CPU 1 is changed from a program A to a program B, processes shown in FIG. 1A are carried out. Referring to FIG. 1A, the data which is to be used in the program A and has been stored in a general-purpose register-set 1a in the CPU 1 is read out therefrom and stored in a first area 2a in an external random access memory (RAM) 2. This process is referred to as a saving process. The external RAM 2 is provided separately from a chip on which the CPU 1 is formed. After the saving process, new data which is to be used in the program B and has been stored in a second area 2b in the external RAM 2 is read out therefrom and set in the general-purpose register-set 1a in the CPU 1. This process is referred to as a restoring process. When the restoring process is completed, the CPU can execute the program B. In contrast with this, when a program to be executed by the CPU 1 is changed from the program B to the program A, the saving process and the restoring process are carried out as shown in FIG. 1B.

The CPU 1 controls the external RAM 2 in accordance with a software provided in the CPU 1 so that the saving process and the restoring process are carried out.

In a case where there is a large number of registers in the general-purpose register-set 1a to which the saving process and the restoring process should be applied in an architecture of the CPU 1, the time required for performing the saving process and the restoring process increases. This time is referred to as a register changing time. Due to the increase in the register changing time, the processing speed in the CPU 1 is reduced.

A register-file method has been known as a method for decreasing the register changing time. In the register-file method, the CPU is not provided with the general-purpose register-set, and a RAM (referred to as a register-file RAM) is formed on an integrated circuit (IC) on which the CPU is formed. The CPU controls the register-file RAM having one or a plurality of register-set areas for storing data required for performing various programs. In this case, since the CPU accesses the register-file RAM formed on the same IC as that on which the CPU is formed when the program to be executed by the CPU is replaced, the register changing time can be reduced.

There are two types of register-file methods.

A first type of register-file method is shown in FIG. 2. Referring to FIG. 2, a CPU 3 is provided with a current-bank-number-register (CBNR) 4. A register-file RAM 5 is formed on an IC on which CPU 3 is formed. An address pointing data ($R_p$) is set in the CBNR 4. A plurality of areas are set in the register-file RAM 5, each area corresponding to a register-set for storing data used for executing each program. A register number (n) specified by an instruction in a program executed by the CPU 3 is added to the address pointing data ($R_p$) stored in the CBNR 4 so that an address ($R_p$+n) is obtained. The address number (n) indicates a position of a register in the register-sets corresponding to the areas in the register-file RAM 5. The address ($R_p$+n) is located in an area corresponding to a register-set storing the program executed by the CPU 3. The CPU 3 accesses data stored at the address ($R_p$+n) in the register-file RAM 5.

The CPU 3 accesses the data stored in the register-file RAM 5 via an internal bus formed of an address bus, a data bus and a control bus, as shown in FIG. 3. The buses are connected to an external RAM (not shown), so that the CPU 3 can also access data stored in the external RAM.

According to the first type of register-file method, when the address pointing data stored in the CBNR 4 is replaced, all the register-sets in which a plurality of programs should be set can be changed at the same time. Thus, a program to be executed by the CPU 3 can be replaced at a high speed.

However, the CPU 3 needs to output an address and a read/write instruction each time data in the register-file RAM 5 is accessed. Thus, a processing tame per one instruction increases. For example, 6 machine cycles (M/C) are required for executing the following instruction in the CPU 3, as shown in Table-1. The machine cycles (M/C) respectively refer to steps in a process performed by the CPU 3.

INSTRUCTION (1) Add data stored in a register area R0 in the register-file RAM 5 to data stored in a register area R1 in the register-file RAM 5.

(2) Store the adding result in the register area R0 in the register-file RAM 5.

TABLE 1

| M/C | OPERATION IN CPU 1 |
|---|---|
| 1 | Fetch operation code |
| 2 | Read data in register area R0 |
| 3 | Read data in register area R1 |
| 4 | Adding operation R0 + R1 (in the CPU 3) |
| 5 | Write the result (R0+R1) in register area R0 |
| 6 | Fetch the next operation code |

A second type of register-file method is shown in FIG. 4. Referring to FIG. 4, the CPU 3 is provided with the CBNR 4 in the same manner as that regarding the first type shown in FIGS. 2 and 3. The CPU 3 is connected to the register-file RAM 5 by an internal bus (the address bus, the data bus and the control bus) and connected to an external RAM by a bus (an address bus, a data bus and a control bus) other than the internal bus. In the second type of register-file method, since the bus connecting the CPU 3 to the external RAM differs from the internal bus connecting the CPU 3 to the register-file RAM 5, a machine cycle using the bus connected to the external RAM and a machine cycle using the internal bus can be serially executed in the CPU 3. That is, a pipeline processing can be carried out. For example, 5 machine cycles (M/C) are required for executing the above instruction in the CPU 3, as shown in Table-2.

TABLE 2

| M/C | OPERATION IN CPU 1 |
|-----|--------------------|
| 1 | Fetch operation code |
| 2 | Read data in register area R0 |
| 3 | Read data in register area R1 |
| 4 | Adding operation R0 + R1 (in CPU 3) |
| 5 | Write the result (R0+R1) in register area R0 Fetch the next operation code |

In a case where a dual-port type RAM capable of simultaneously accessing two addresses is used as the register-file RAM 5, the second and third machine cycles (M/C=2 and 3) in Table-2 can be serially carried out. Further, in a case where a triple-port type RAM capable of simultaneously accessing three addresses is used as the register-file RAM 5, the second, third and fifth machine cycles (M/C=2, 3 and 5) in Table-2 can be serially carried out. Thus, in this case, the above instruction can be substantially performed in one machine cycle.

However, in the above second type of register-file method, in which the dual-port type RAM or the triple-port type RAM is used as the register-file RAM, the amount of hardware in the integrated circuit increases.

SUMMARY OF THE INVENTION

Accordingly, a general object of the present invention is to provide a novel and useful integrated circuit including a central processing unit in which the disadvantages of the aforementioned prior art are eliminated.

A more specific object of the present invention is to provide an integrated circuit including a central processing unit in which a processing speed can be reduced without increasing the amount of hardware therein.

According to the present invention, when a program executed in the central processing unit is changed, data required for executing the program is replaced by using a first memory in the central processing unit and the second memory, coupled to the central processing unit. Thus, a processing speed can be improved without increasing the amount of hardware in the integrated circuit.

Additional objects, features and advantages of the present invention will become apparent from the following detailed description when read in conjunction with the accompanying drawings.

BRIEF DESCRIPTION OF THE DRAWINGS

FIG. 8 is a block diagram illustrating an integrated circuit including a CPU according to a second embodiment of the present invention.

FIG. 13 is a timing chart illustrating four instructions executed by the CPU shown in FIG. 11.

FIG. 14 is a block diagram illustrating an integrated circuit including a CPU according to a fourth embodiment of the present invention.

DESCRIPTION OF THE PREFERRED EMBODIMENTS

A description will now be given of a first embodiment of the present invention with reference to FIGS. 5 through 7.

Figure 4:
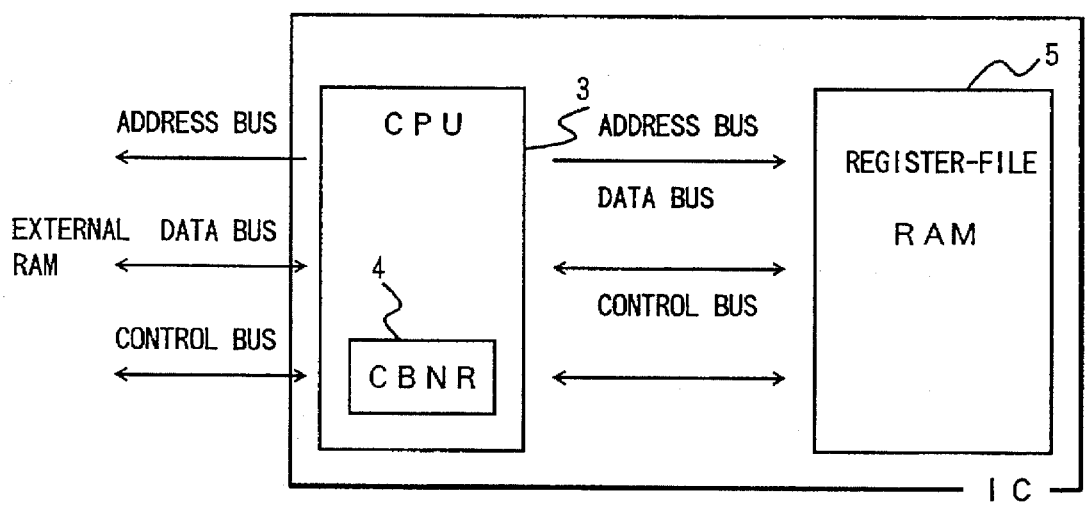
Figure 5:
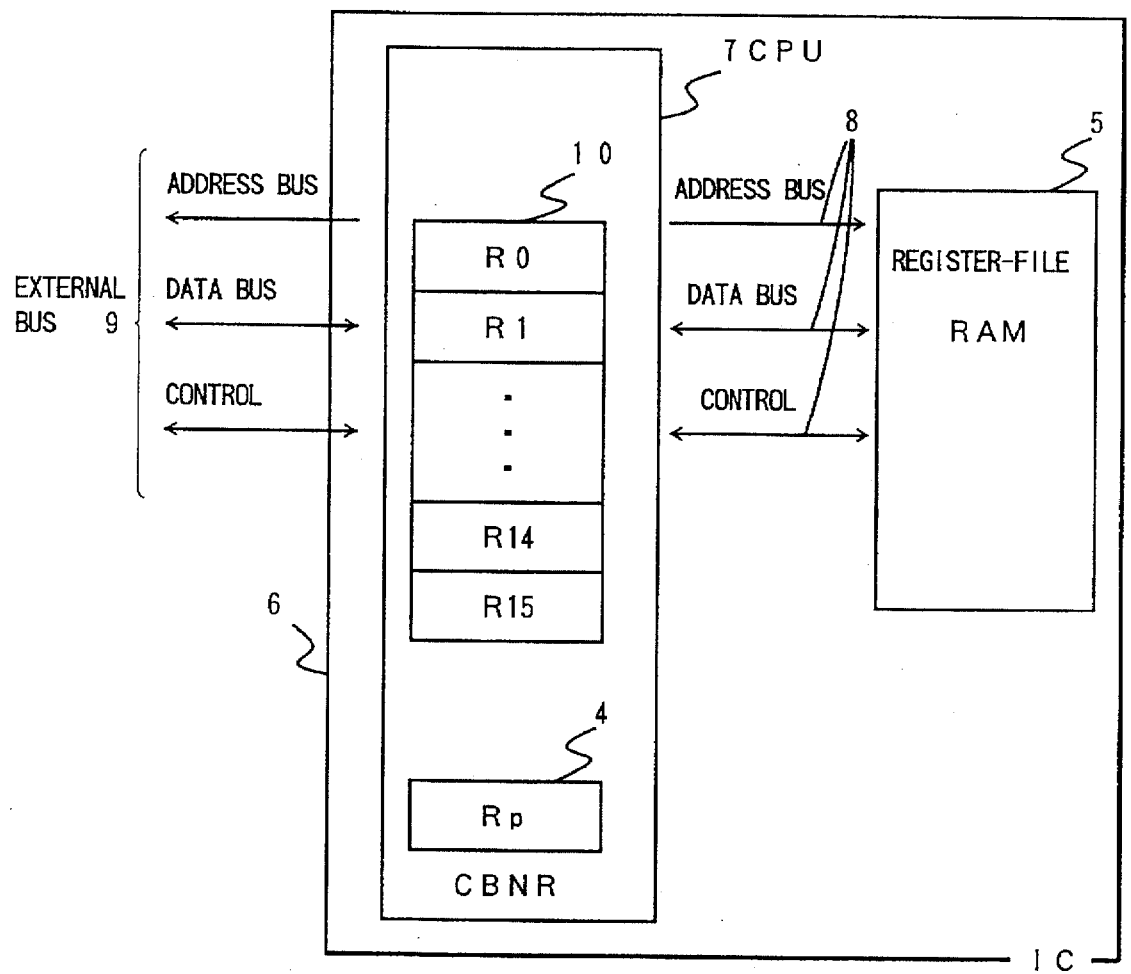
FIG. 5 is a block diagram illustrating an integrated circuit including a CPU according to a first embodiment of the present invention.

FIG. 5 shows a structure of an integrated circuit including a central processing unit according to the first embodiment of the present invention. In FIG. 5, those parts which are the same as those shown in FIG. 4 are given the same reference numbers.

Referring to FIG. 5, a CPU 7 and a register-file RAM 5 are provided in an integrated circuit 6. The CPU 7 is connected to the register-file RAM by an internal bus 8. The internal bus 8 is formed of an address bus, a data bus and a control bus. The CPU 7 is also connected to an external RAM which is separated from the integrated circuit 6 by an exclusive bus 9. The exclusive bus 9 is formed of an address bus, a data bus and a control bus, in the same manner as the internal bus 8. The CPU 7 is provided with a register set 10. The register set 10 is toned of a predetermined number of registers. In the first embodiment, the register set 10 has sixteen registers R0 through R15. The register set 10 has a triple-port type construction. That is, read operations of two registers and a write operation of one register can be simultaneously carried out. The register set 10 is used for storing data required for executing a program in the CPU 7. The CPU 7 is also provided with a CBNR (a current-bank-number-register) 4. The CBNR 4 stores address pointing data ($R_p$) indicating a leading position of an area, in the register-file RAM 5, storing data required for executing a program in the CPU 7. An area, in the register-file RAM 5, for storing the data required for executing a program in the CPU 7 is referred to as a register-set area. Addresses in each register-set area in the register-file RAM 5 respectively correspond to registers R0 through R15 of the register set 10.

Data required for executing a program in the CPU 7 is stored in the register set 10 in the CPU 7. The same data as that in the register set 10 is always stored in a predetermined register-set area in the register-file RAM 5. Thus, the CPU 7 reads required data from the register set 10 therein, and writes updated data into both an accessed register in the register set 10 and a corresponding address in a register-set area, in the register-file RAM 5, for storing data required in the program actually executed in the CPU 7. The read/write operation is carried out by a micro program and a control portion provided in the CPU 7.

A single-port type RAM in which only one address can be accessed by one operation is used as the register-file RAM 5. Even in this case, a program can be effectively executed in the CPU 7. The reason for this will be described later.

A description will now be given of a pipeline processing carried out in the integrated circuit 6 including the CPU 7.

Figure 6:
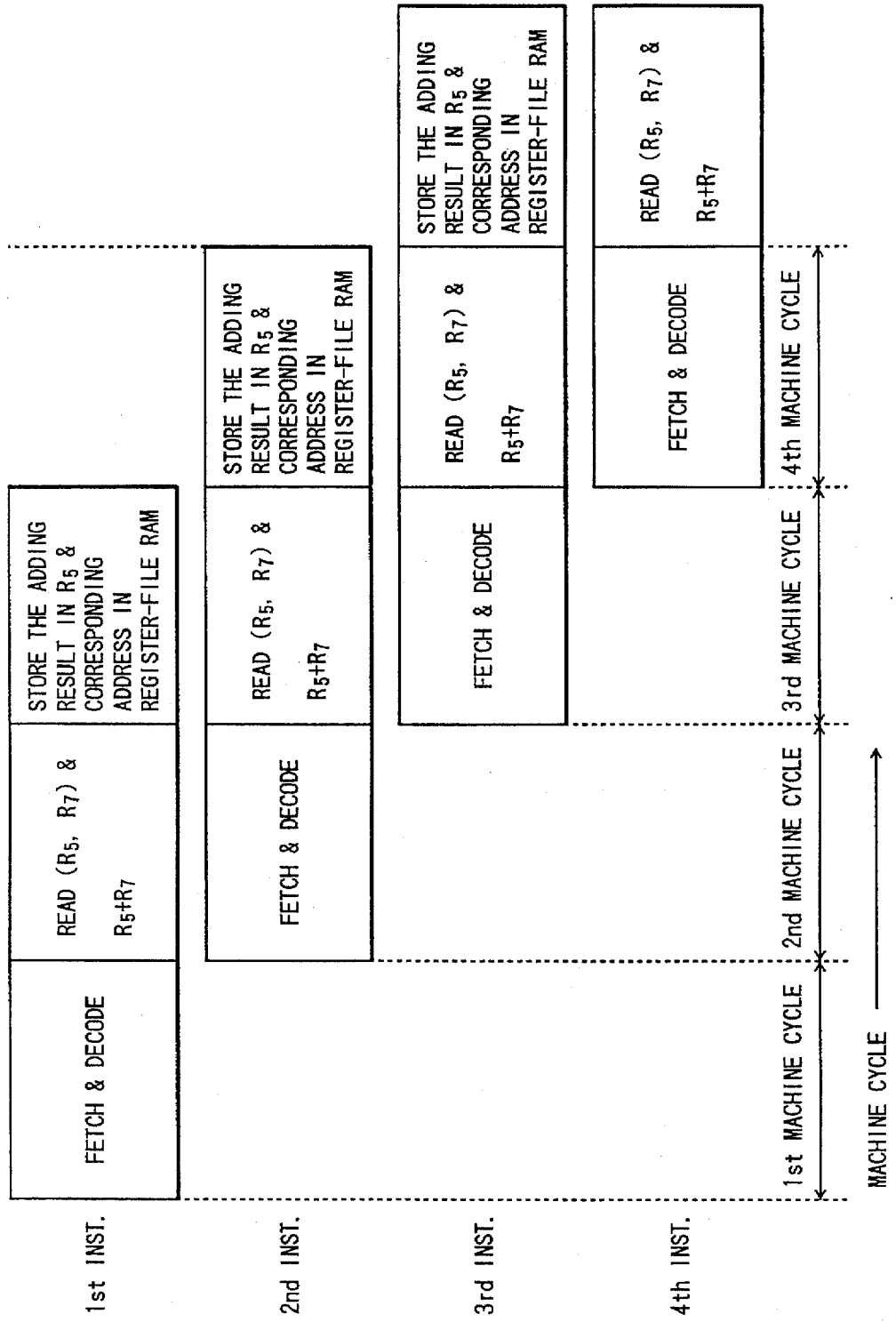
FIG. 6 is a timing chart illustrating four instructions executed in the CPU shown in FIG. 5.

FIG. 6 shows machine cycles in a case where the following instruction is repeated carried out four times.

INSTRUCTION (1) Add data stored in a register R5 to data stored in a register R7.

(2) Store the adding result in the register R5.

Referring to FIG. 6, periods in a transverse axis respectively indicate machine cycles. A first instruction is executed in three machine cycles as follows. The first instruction is fetched and decoded in a first machine cycle. Since the register-set 10 in the CPU 7 has the triple-port type construction, read operations of registers R5 and R7 and an adding operation (R5+R7) are simultaneously carried out in a second machine cycle. The adding result obtained in the second machine cycle is stored in both the register R5 in the register-set 10 and a corresponding address in the register-file RAM 5 in a third machine cycle.

The second, third and fourth instructions are executed in three machine cycles in the same manner as the first instruction. After operations of the first instruction are completed in the first machine cycle, an instruction reading part of the CPU 7 enables an instruction to be fetched. Thus, while operations of the first instruction are carried out in the second machine cycle, a fetch operation and a decoding operation of the second instruction are carried out. That is, in the second machine cycle, operations of both the first and second instructions are simultaneously carried out. After arithmetic of the first instruction have been completed in the second machine cycle, an arithmetic part of the CPU 7 can carry out arithmetic. Thus, while operations of the first instruction are carried out in the third machine cycle, a reading operation of the registers R5 and R7 and the arithmetic (R5+R7) of the second instruction are carried out. Further, since the exclusive bus 9 connecting the CPU 7 to the external RAM is separated from the internal bus 8 connecting the CPU 7 to the register-file RAM 5, and the register-set 10 in the CPU 7 has the triple-port type construction, while the operations of the first instruction are carried out in the third machine cycle, a fetch operation and a decoding operation of the third instruction are also carried out. That is, the operations of the first, second and third instructions are simultaneously carried out in the third machine cycle. As operations of a plurality of instructions are simultaneously carried our in each machine cycle, as described above, one instruction can be apparently carried out in one machine cycle.

The register-file RAM is accessed only in a case where the arithmetic result is stored therein. That is, one access with respect to the register-file RAM 5 is carried out in one machine cycle. Thus, the register-file RAM does not need to have a dual-port type or a triple-port type construction, but may have a single-port type construction capable of accessing only one address in one operation. As a result, a large amount of internal bus and a complex circuit for controlling the register-file RAM are not needed, and the amount of hardware is prevented from increasing. In addition, the above pipeline operation can be executed at a high speed.

Figure 7:
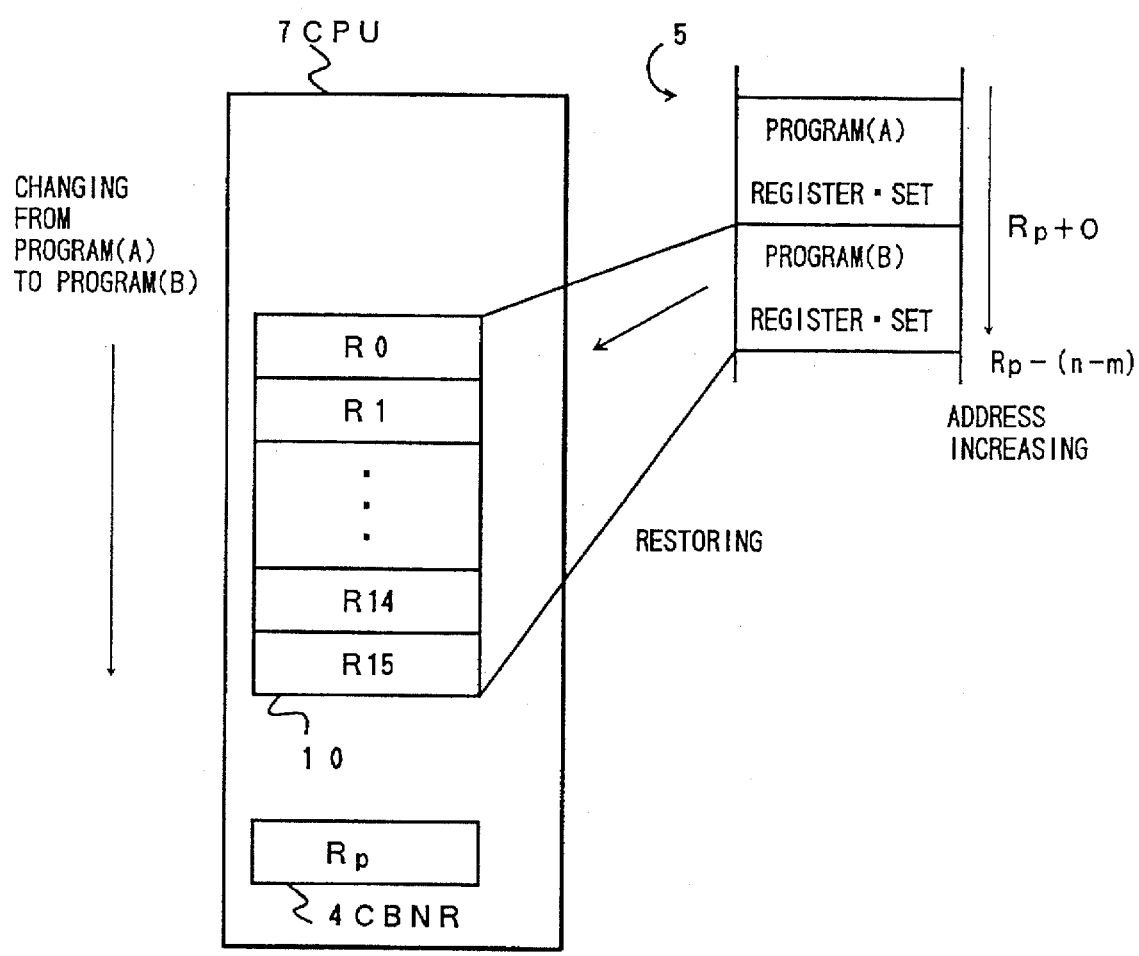
FIG. 7 is a diagram illustrating a process for replacing data required for executing a program.

To change a program to be executed in the CPU 7, the data stored in the register-set 10 in the CPU 7 is replaced as shown in FIG. 7. FIG. 7 shows the CPU 7 and the register-file RAM 5. The register-file RAM 5 has a first register-set area storing data required for executing a program A and a second register-set area for storing data required for executing a program B.

While the program A is being executed in the CPU 7, data required for executing the program A is stored In the register-set 10. Then, when a program to be executed in the CPU 7 is changed from the program A to the program B, data stored in addresses of the second register set area in the register-file RAM 5 is accessed based on the address pointing data in the CBNR 4. Then the data stored in the second register set area in the register-file RAM 5 is read out and stored in the register-set 10 in the CPU 7. In this case, since the data stored in both the register-set 10 and the register-file RAM 5 are always simultaneously updated, the data which has been stored in the register set 10 in the CPU 7 to be used for executing the program A does not need to be saved in the register-file RAM 5. Thus, the register changing time can be decreased.

Figure 1A:
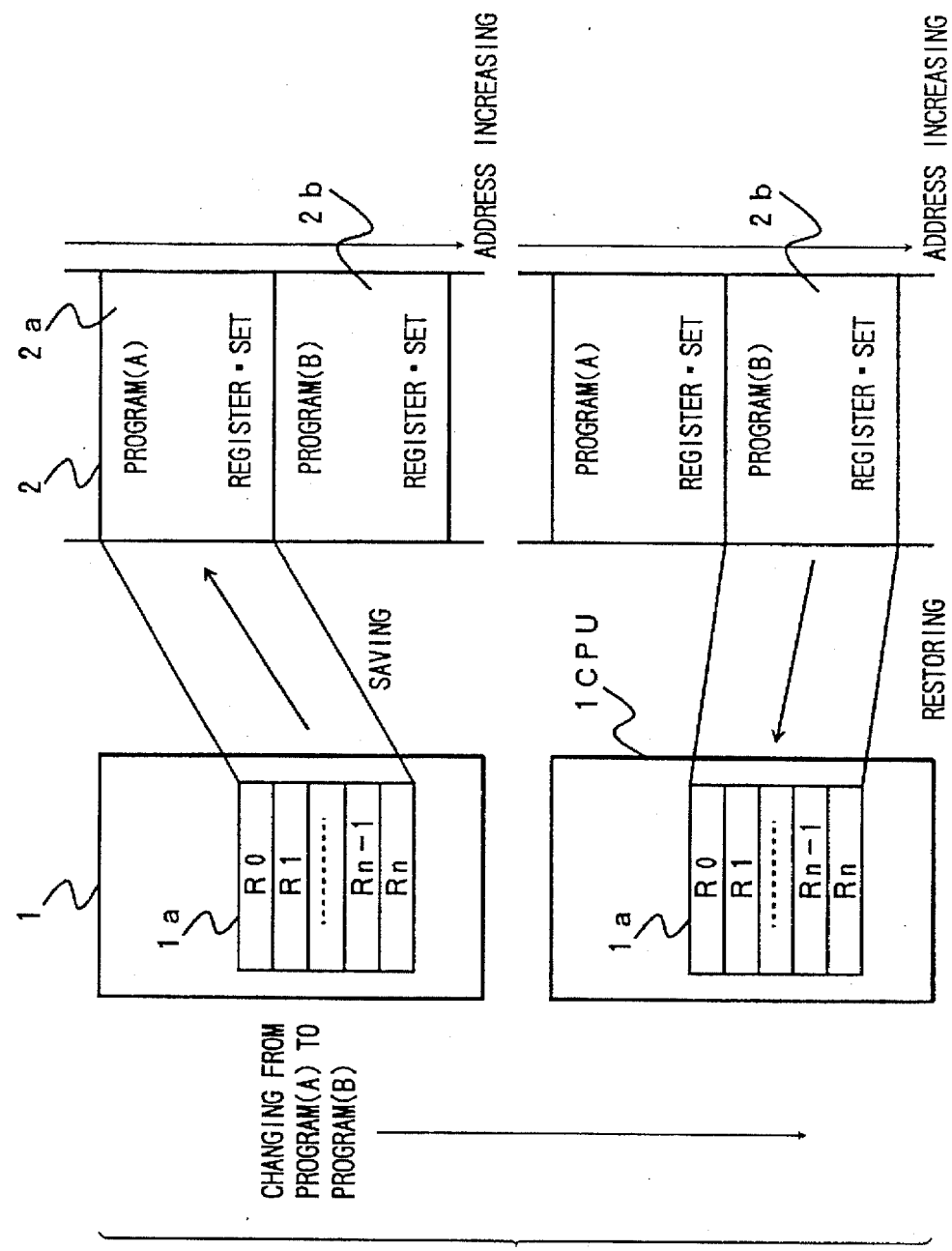
FIGS. 1A and 1B are block diagrams illustrating conventional processes for replacing data in a general-purpose register set provided in a CPU.
Figure 1B:
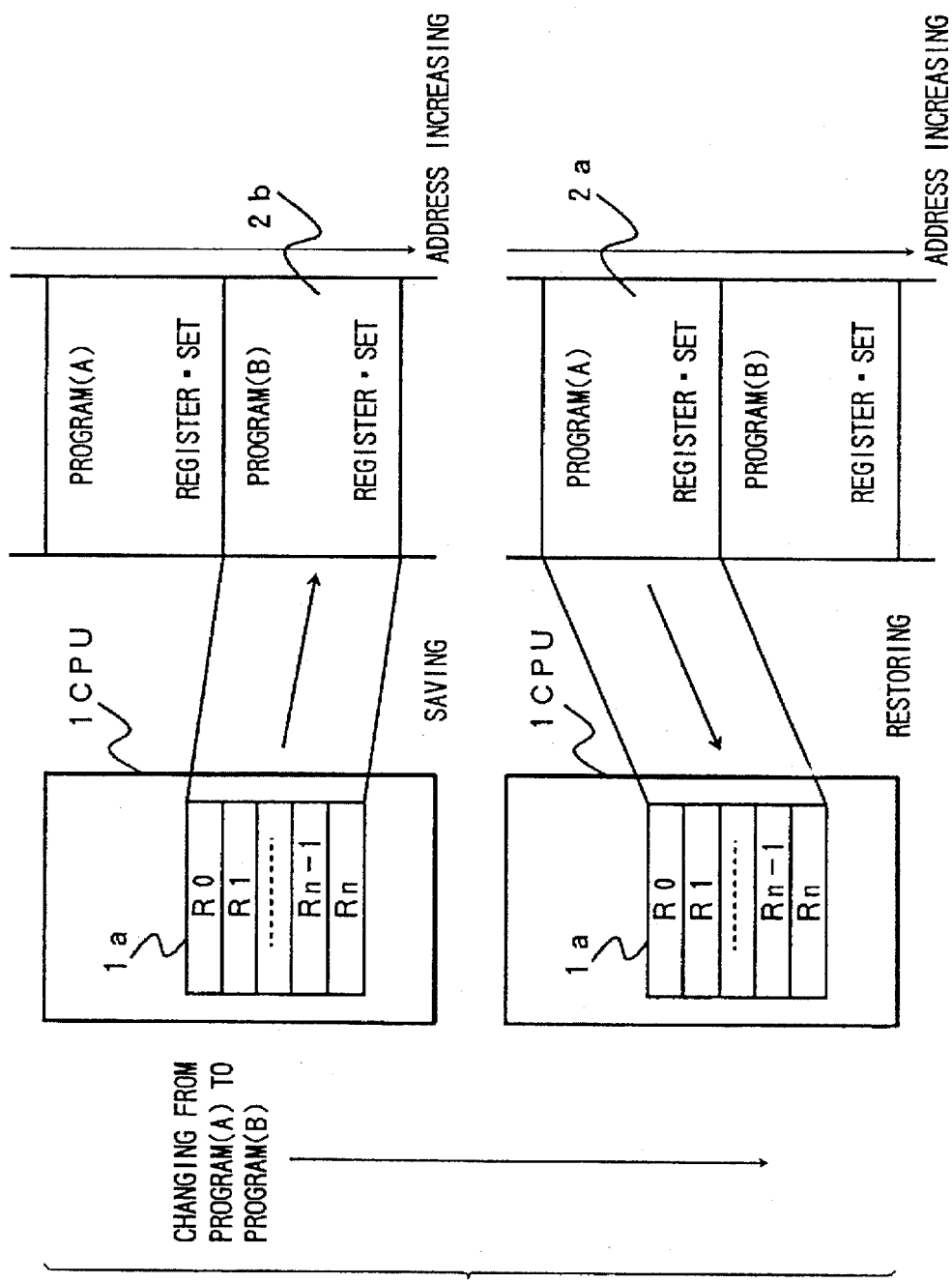

The number of machine cycles required in the conventional case (shown in FIGS. 1A and 1B) and in the above first embodiment of the present invention for replacing the data stored in the register-set 10 in the CPU 7 in a case where the register set 10 includes sixteen registers each having 32 bits, a capacity of a data bus in the exclusive bus 9 is 16 bits, and two machine cycles corresponds to one bus cycle, is mentioned below.

In the conventional case (shown in FIGS. 1A and 1B), the following number of machine cycles is required.

$$16 \times (32 \div 16) \times 2 \times 2 = 128,$$

where 16 (first): z the number of registers in the register set 10

32: the number of bits in each register 16 (second): the number of bits in the data bus 2 (first): the number of machine cycles 2 (second): the number of operations (saving and restoring operations)

That is, in the conventional case, 128 machine cycles are required for replacing the data stored in the register set 10.

On the other hand, in the above first embodiment of the present invention, the following number of machine cycle is required.

$$16 \times (32 \div 32) \times 1 \times 1 = 16,$$

where

16: the number of registers in the register set 10

32 (first): the number of bits in each register 32 (second): the number of bits in the data bus 1 (first): the number of machine cycle 1 (second): the number of operation (only the restoring operation).

That is, in the first embodiment described above, 16 machine cycles are required for replacing the data stored in the register set 10. The processing speed in the process for replacing the data stored in the register set 10 is eight times greater than that obtained in the conventional case.

As has been described above, the register set 10 in the CPU 7 has the triple-port type construction and the CPU 7 is connected to the register-file RAM 5 by the internal bus 8. Thus, the processing time (the number of machine cycles) can be decreased. In addition, since the data stored in the register set 10 can be replaced by only the restoring process, the register changing time can be decreased also.

Since the exclusive bus 9 connecting the CPU 7 to the external RAM is separated from the internal bus 8 connecting the CPU 7 to the register-file RAM 5, operations with respect to the external RAM and operations with respect to the register-file RAM 5 can be simultaneously carried out. Thus, data transfer between the CPU 7 and both the external RAM and the register-file RAM 5 can be executed at a high speed.

When the data stored in the register set 10 in the CPU 7 is replaced, the exclusive bus 9 is not used. Thus, while the data stored in the register set 10 is replaced, the data from the external RAM can be fetched via the exclusive bus 9.

According to the first embodiment of the present invention, the register set 10 is provided in the CPU 7 and the register-file 5 is provided on the IC 6 on which the CPU 7 is formed. As a result, both the processing time and the register changing time can be improved without increasing the amount of hardware in the IC 6.

A description will now be given of a second embodiment of the present invention with reference to FIGS. 8 through 10.

FIG. 8 shows a structure of an integrated circuit including a central processing unit according to the second embodiment of the present invention. In FIG. 8, those parts which are the same as those shown in FIG. 4 are given the same reference numbers.

Referring to FIG. 8, a CPU 107 and a register-file RAM 5 are formed on an IC 106. The CPU 107 is connected to the register-file RAM 5 is by an internal bus 108 formed of a data bus, an address bus and a control bus. The CPU 107 is connected to an external RAM by an exclusive bus formed of a data bus, an address bus and a control bus. The CPU 107 is provided with a register set 110 having a predetermined number of registers. The CPU 107 is also provided with a CBNR 4. Address pointing data ($R_p$) is stored in the CBNR 4.

The register set 110 has a global register set 110a and a local register set 110b. The global register set 110a and the local register set respectively have one or a plurality of registers. The global register set 110a is formed, for example, of m+1 registers R0 through Rm, and the local register set 110b is formed, for example, of (n−m) registers (Rm+1) through Rn. Common data shared by a plurality of programs to be executed in the CPU 107 is stored in the global register set 110a. The local register set 110b is used for storing data individually required for executing a program in the CPU 107. The register set 110 has the triple-port type construction in which read operations with respect to two registers and write operation with respect to one register can be simultaneously carried out.

The CPU 107 carries out read operation with respect to the global register set 110a and the local register set 110b. The CPU 107 writes updated common data in only the global register set 110a, and writes updated data both in the local register set 110b and a corresponding register act area in the register-file RAM 5. The read/write operation is carried out by a micro program and a control portion provided in the CPU 107. The register-file RAM always stores data the same as that in the local register set 110b.

The common data required for executing all programs in the CPU 107 is always stored in the global register set 110a. Only the data to be replaced when a program to be executed in the CPU 107 is changed is stored in the local register set 110b. As a result, the amount of data to be replaced when changing the program can be decreased. That is, the register changing time can be decreased. The register-file RAM 5 has a single-port type construction.

Figure 2:
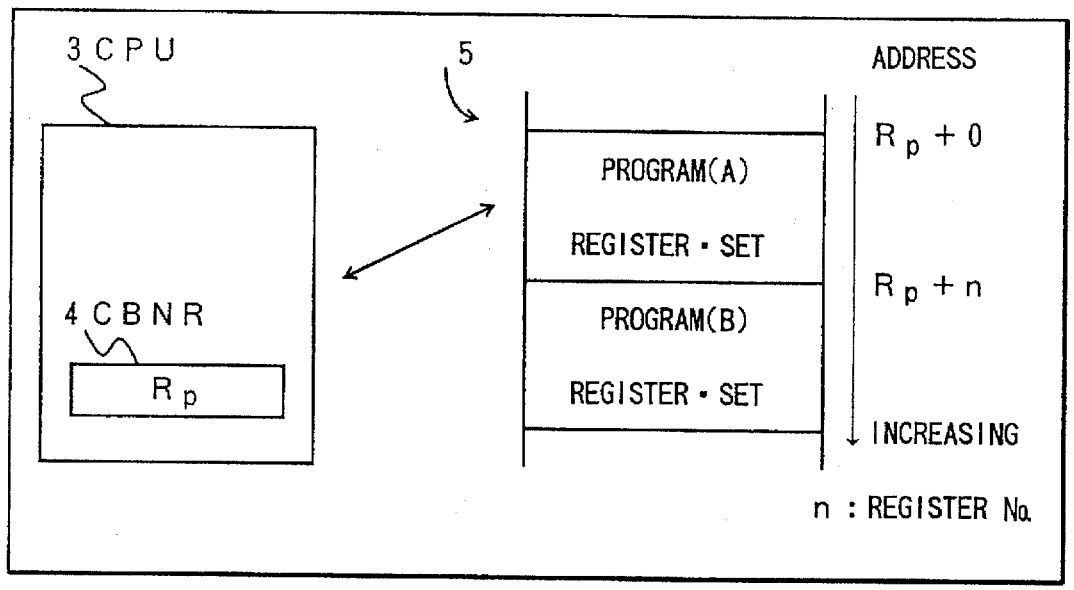
FIGS. 2, 3 and 4 are block diagrams illustrating conventional integrated circuits each including a CPU.
Figure 3:
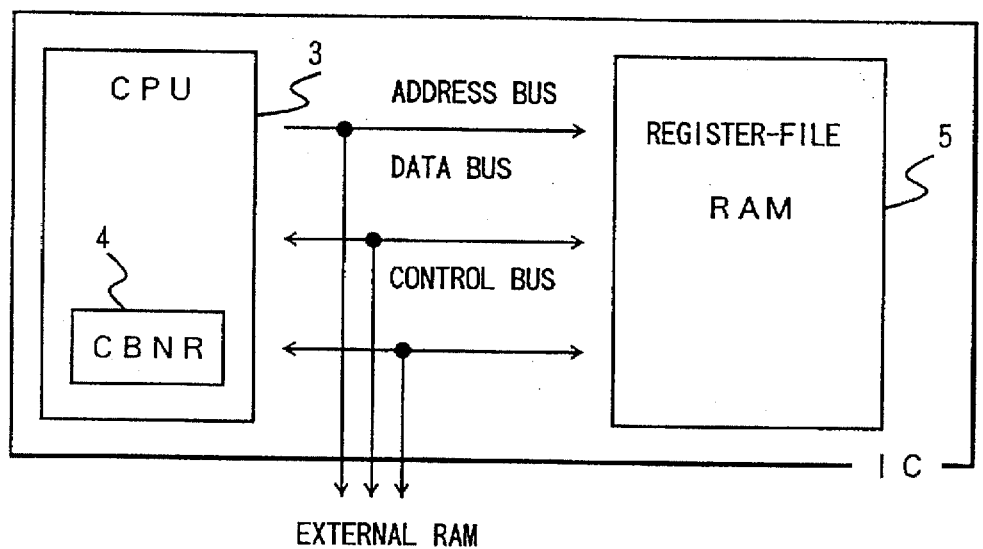

A pipeline process is carried out in the IC 106 according to the second embodiment in accordance with the same machine cycles as those shown in FIG. 2, in a case where the following instruction is repeated four times.

INSTRUCTION (1) Add data stored in a register R5 in the local register set 110b to data stored in a register R7 in the local register set 110b.

(2) Store the adding result in the register R5 in the local register set 110b.

Figure 9:
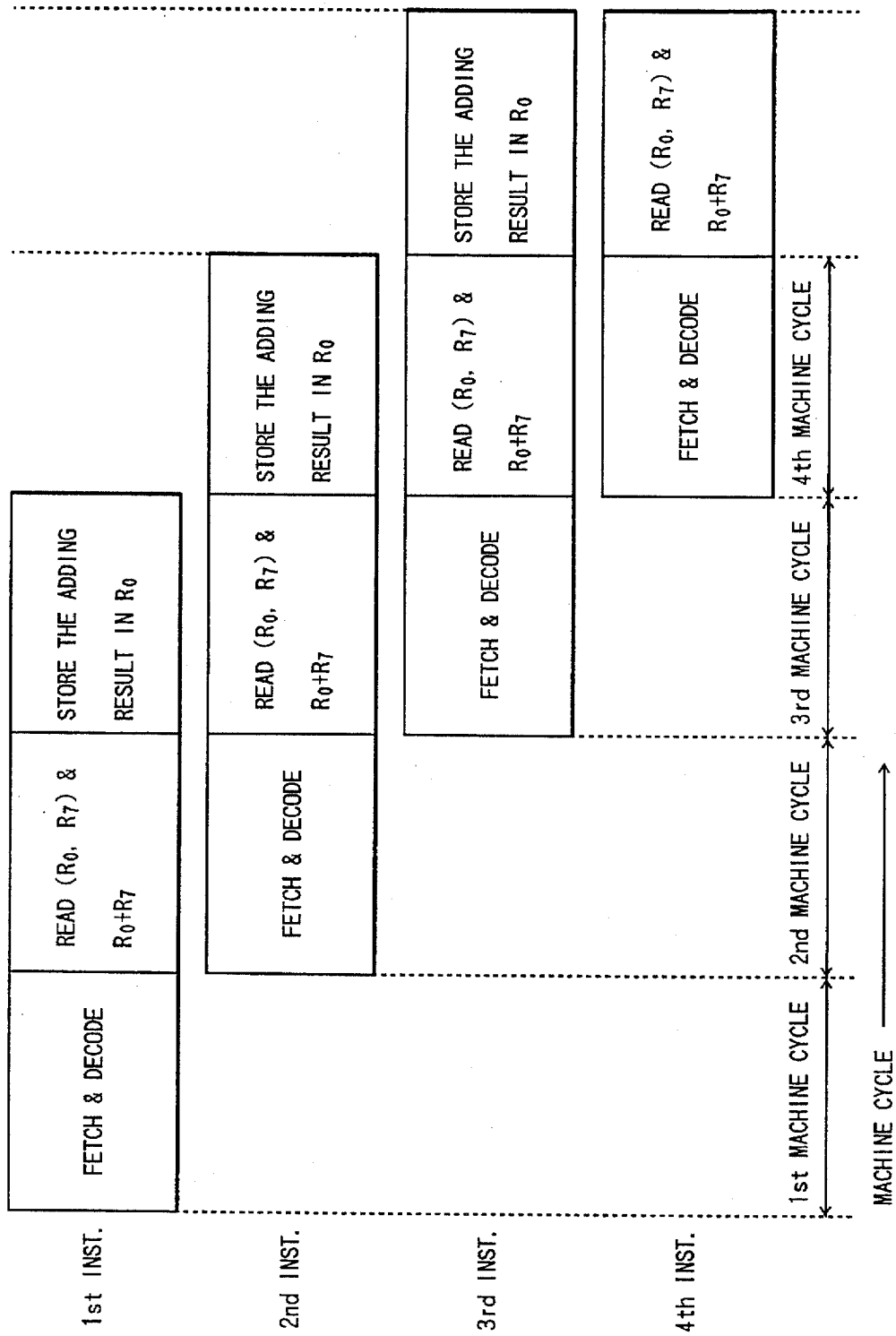
FIG. 9 is a timing chart illustrating four instructions executed by the CPU shown in FIG. 8.

FIG. 9 shows machine cycles in a case where the following instruction is repeated four times.

INSTRUCTION (1) Add data stored in a register R7 in the local register set 110b to common data stored in a register R0 in the global register set 110a.

(2) Store the adding result, as common data, in the register R0 in the global register set 110a.

In this case, each instruction is executed in three machine cycles in the same manner as that in the above case. However, when the adding result (R0 +R7) is stored in the global register vet 110a, the adding result is not stored in the register-file RAM 5. That is, the adding result (R0+R7) is stored only in the register R0 in the global register set 110a. In addition, since the register set 110 is formed of the triple-port register, an operation for storing the adding result in the first instruction, arithmetic in the second instruction, and the operations of fetching and decoding are simultaneously carried out in the third machine cycle. Thus, one instruction can be executed in one machine cycle, in the same manner as that in the above case.

Figure 10:
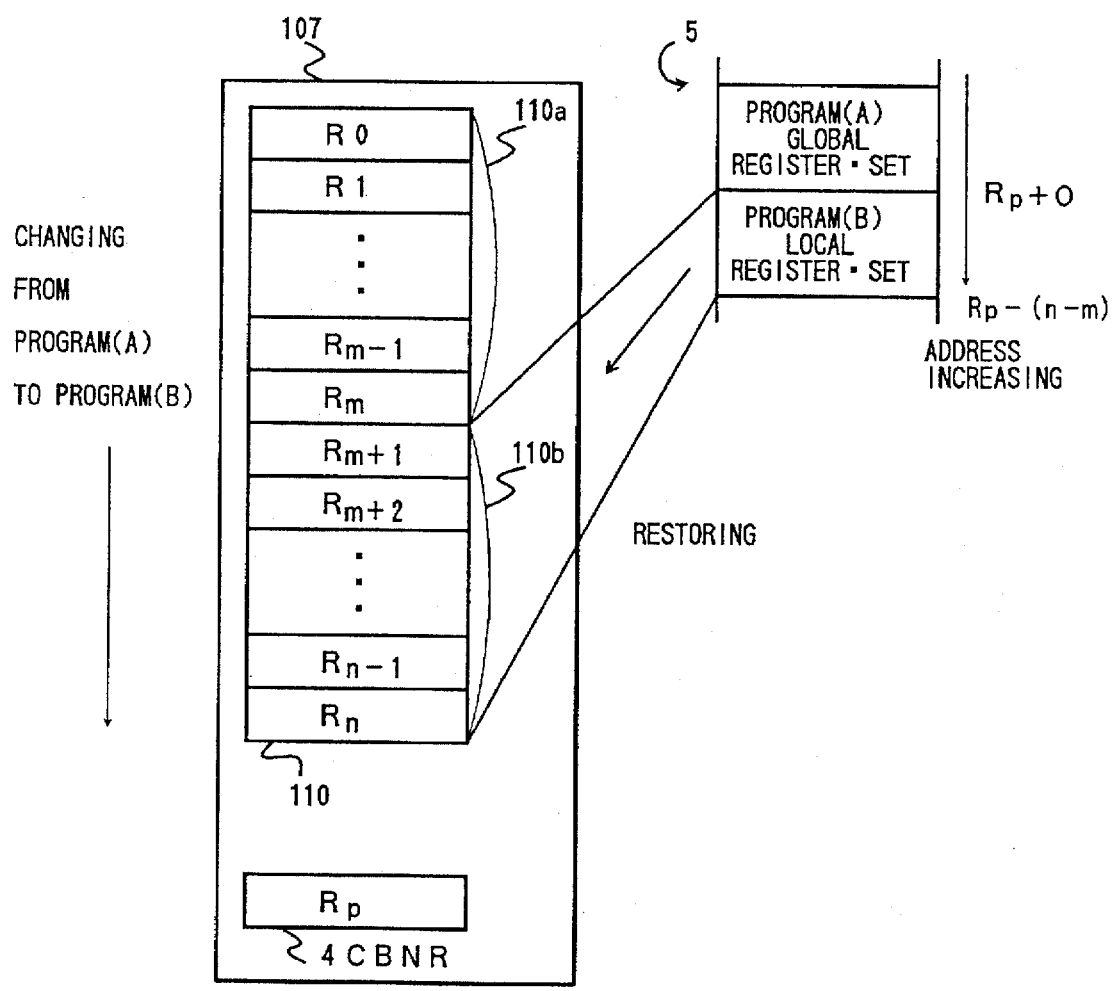
FIG. 10 is a diagram illustrating a process for replacing data required for executing a program.

To change a program to be executed in the CPU 107, the data stored in the register-set 110 in the CPU 107 is replaced as shown in FIG. 10. FIG. 10 shows the CPU 107 and the register-file RAM 5. The register-file RAM 5 has a first register-set area for storing data required for executing only a program A and a second register-set area for storing data required for executing only a program B.

In a case where a program to be executed in the CPU 107 is changed from the program A to the program B, address pointing data stored in the CBNR 4 is replaced to that corresponding to a leading address ($R_p$+o) in the second register set area in the register-file RAM 5. The second register set area is identified by the address pointing data ($R_p$+o) stored in the CBNR 4, and data stored in the second register area is read out and stored in registers (Rm+1) through Rn of the local register set 110b. That is, the data in the local register set 110b can be replaced by only one restoring process without a saying process. As a result, the register changing tame can be decreased.

A read/write operation with respect to common data stored in the global register set 110a is carried out only in the CPU 107, and the common data, unlike the data stored in the local register set 110b, is not replaced.

A description will now given of the number of machine cycles required for replacing the data stored in the register-bet 110 in the CPU 107 in a case where the register set 110 includes sixteen registers each having 32 bits, a capacity of a data bus in the exclusive bus 109 is 16 bits, and machine cycles correspond to one bus cycle.

In the conventional case (shown in FIGS. 1A and 1B), the following number of machine cycles is required.

$$16\times(32\div16)\times2\times2=128,$$

where 16 (first): the number of registers in the register set 10

32: the number of bits in each register 16 (second): the number of bits in the bus 2 (first): the number of machine cycles 2 (second): the number of operations (saying and restoring operations)

That is, in the conventional case, 128 machine cycles are required for replacing the data stored in the register set 10.

On the other hand, in the above second embodiment of the present invention, the following number of machine cycles is required in a case where the register set 110 includes sixteen registers each having 32 bits, both the global register 110a and the local register set 110b have eight registers, the capacity of the internal bus 108 is 32 bits, and the register-file RAM 5 can be accessed in one machine cycle.

$$8\times(32\div32)\times1\times1=8,$$

where

8: the number of registers in the local register set 110b 32 (first): the number of bits in each register 32 (second): the number of bits in the data bus 1 (first): the number of machine cycles 1 (second): the number of operations (only the restoring operation).

That is, in the second embodiment described above, 8 machine cycles are required for replacing the data stored in the register set 110. The processing speed of the process for replacing the data stored in the register set 110 is greater than that obtained in the conventional case by sixteen times.

As has been described above, the register set 110 in the CPU 107 has the triple-port type construction and the CPU 107 is connected to the register-file RAM 5 by the internal bus 108. Thus, the processing time (the number of machine cycles) can be decreased. In addition, since the data stored in the register set 110 can be replaced by only the restoring process, the register changing time can be decreased also.

In the second embodiment, the register set 110 is divided into the global register set 110a and the local register set 110b, and data stored in the local register set is replaced when a program to be executed in the CPU 107 is changed. The common data stored in the global register set 110a is not replaced when a program to be executed in the CPU 107 is changed. Thus, the changing time is further decreased.

Since the exclusive bus 109 connecting the CPU 107 to the external RAM is separated from the internal bus 108 connecting the CPU 107 to the register-file bus 108, operations with respect to the external RAM and operations with respect to the register-file RAM 5 can be simultaneously carried out. Thus, data transfer between the CPU 107 and both the external RAM and the register-file RAM 5 can be executed at a high speed.

When the data stored in the register set 110 in the CPU 107 is replaced, the exclusive bus 109 is not used. Thus, while the data stored in the register set 110 is replaced, the data from the external RAM can be fetched via the exclusive bus 109.

A description will now be given of a third embodiment of the present invention with reference to FIGS. 11 through 13.

Figure 11:
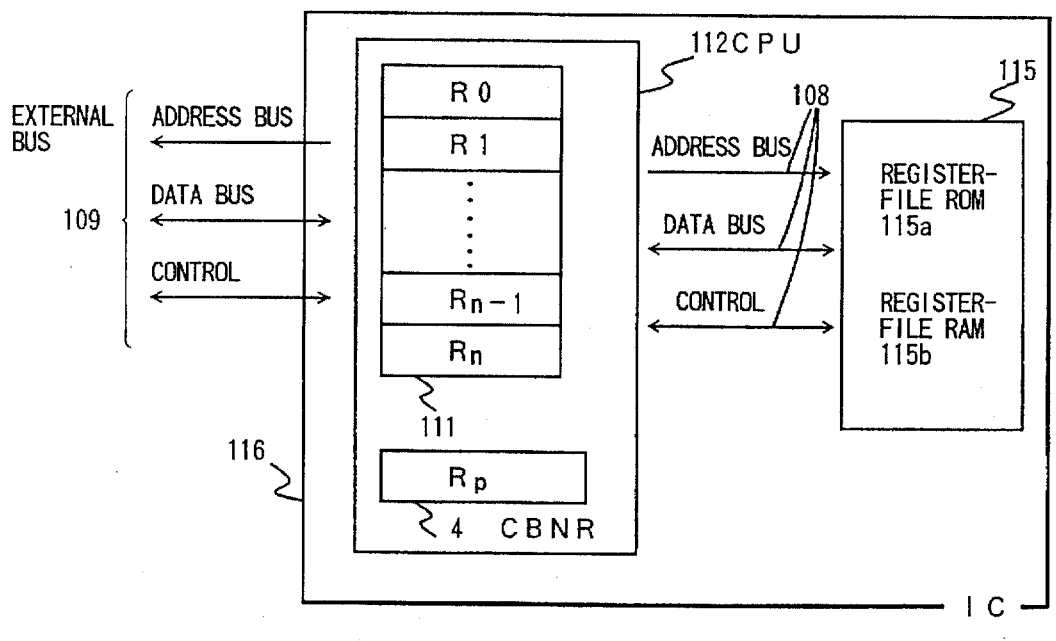
FIG. 11 is a block diagram illustrating an integrated circuit including a CPU according to a third embodiment of the present invention.

FIG. 11 shows a structure of an integrated circuit including a central processing unit according to the third embodiment of the present invention. In FIG. 11, those parts which are the same as those shown in FIG. 8 are given the same reference numbers.

Referring to FIG. 11, a CPU 112 and a register-file memory 115 are formed on an IC 116. A CPU 112 has a register set 111 and the CBNR 4. The register set 112 is not divided into the global register set and the local register set, as in the second embodiment. The CPU 112 and the register-file memory 115 are connected to each other by the internal bus 108. The register-file memory 115 includes a register-file ROM 115a formed of a read only memory and a register-file RAM 115b formed of a random access memory.

Figure 12:
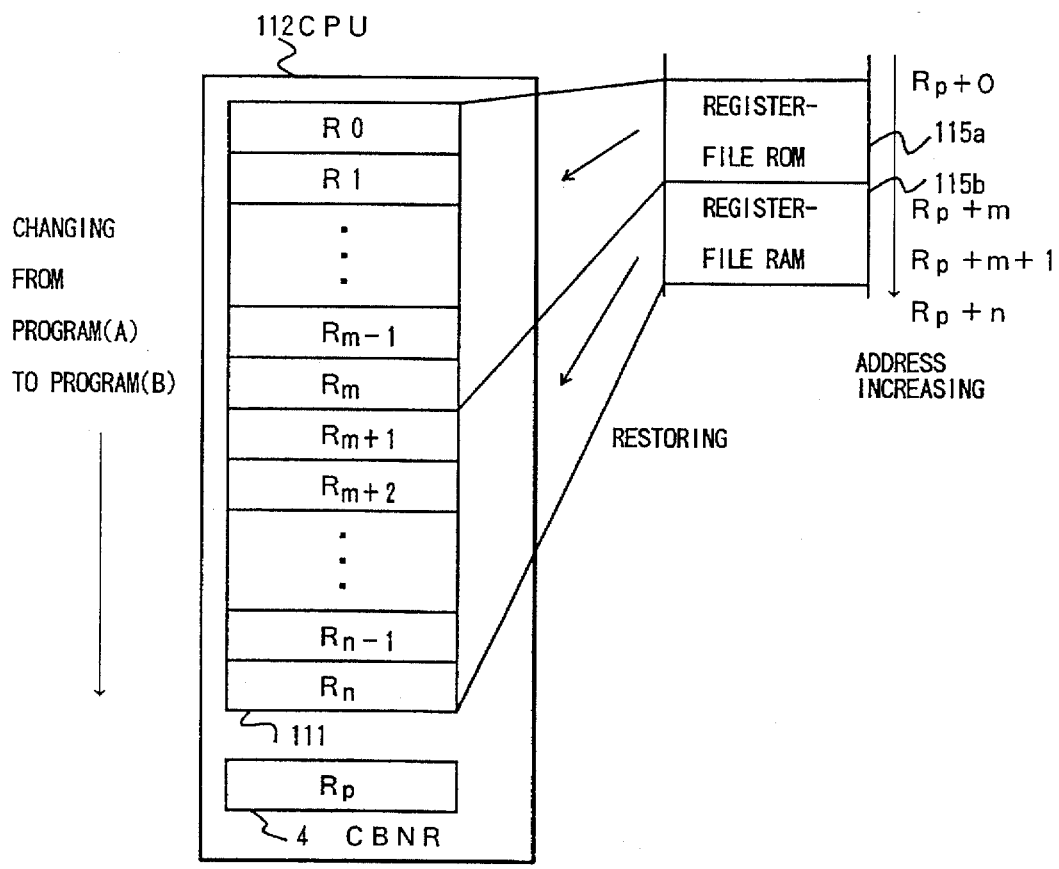
FIG. 12 is a diagram illustrating a process for replacing data stored in a register set shown in FIG. 11.

An address mapping of the register-file memory 115 is formed as shown in FIG. 12. A first register set area which is in a range of addresses $(R_p+0)-(R_p+m)$ is set in the register-file ROM 115a. A second register set area which is in a range of addresses $(R_p+m+1)-(R_p+n)$ is set in the register-file RAM 115b. $R_p$ is referred to as address pointing data, and it is stored in the CBNR 4 in the CPU 112. The addresses $(R_p+0)$ through $(R_p+m)$ in the register-file ROM 115a respectively correspond to registers R0 through Rm in the register set 111 in the CPU 112. The addresses $(R_p+m+1)$ through $(R_p+n)$ in the register-file RAM 115b respectively correspond to registers Rm+1 through Rn in the register set 111 in the CPU 112. The register set 111 has the triple-port type construction in the same manner as that in the second embodiment. Thus, reading operations with respect to two registers and a write operation with respect to one register can be simultaneously carried out. The register-file ROM 115a and the register-file RAM 115b are respectively formed of single-port type ROM and RAM in the same manner as the register-file RAM 5 in the second embodiment.

Read operations with respect to the registers Rm+1 through Rn, in the register set 111, corresponding to the register-file RAM 115b are carried out in the CPU 112. In an write operation of the CPU 112, updated data is written both in an identified register from among registers Rm+1 through Rn and in a corresponding address in the register-file RAM 115b. Thus, the register-file RAM 115b always stores the same data as the registers Rm+1 through Rn in the register set 111.

Both read and write operations with respect to the registers R0 through Rm, in the register set 111, corresponding to the register-file ROM 115a are carried out in the CPU 112. Thus, there is a case where data stored in the registers R0 through Rm differs from data stored in the register-file ROM 115a.

A description will now be given of a pipeline processing carried out in the integrated circuit 116 including the CPU 112.

FIG. 13 shows machine cycles in a came where the following instruction is repeated four times.

INSTRUCTION (1) Add data stored in a register Ro corresponding to an address in the register-file ROM 115a to data stored in a register R7 corresponding to an address in the register-file RAM 115b.

(2) Store the adding result in the register R7.

The pipeline processing shown in FIG. 13 is carried out in the same manner as that described with reference to FIG. 6 in the second embodiment. The CPU 112 is connected to the register-file memory 115 by the internal bus 108 and is connected to an external RAM by the exclusive bus 109 separated from the internal bus 108. The register set 111 in the CPU 112 has the triple-port type construction. Thus, each instruction is executed in three machine cycles. For example, in the first instruction, the adding result (R7+R0) is stored in both the register R7 and a corresponding address in the register-file RAM 115b in the third machine cycle. In the third embodiment, one instruction can be apparently executed in one machine cycle as in the third cycle shown in FIG. 13.

The register-file RAM 115b is formed of a single-port RAM. The register-file RAM 115b always stores the same data as the register set 111 in the CPU 112. When a program to be executed in the CPU 112 is changed, data stored in the register set 111 is replaced by only the restoring process without the saving process. Thus, the register changing time can be decreased.

Constant data required for executing each program is stored in the register-file ROM 115a. Due to setting an address pointing data corresponding to the register set area in the register-file ROM 115a in the CBNR 4, the constant data can be read from the register-file ROM 115a. When a program to be executed in the CPU 112 is changed, the data in the register-file ROM 115a is stored in the register set 111 without saving the data which has been stored in the register set 111.

Even if the data stored in the registers R0 through Rm corresponding to the register-file ROM 115a is replaced, the data stored in the register-file ROM 115a is not replaced. Thus, the registers R0 through Rm in the register set 111 can be reset to initial data stored in the register-file ROM 115a. Programs to be executed in the CPU 112 can be made without considering changes of the constant data stored in the register-file ROM 115a. As a result, a degree of freedom in a process for making the programs improved.

In the second embodiment, data stored only in the local register set 110b having eight registers. In the third embodiment shown in FIG. 12, since the restoring process with respect to data stored both in the register-file ROM 115a and the register-file RAM 115b must be carried out. That is, data stored in the register set 111 having sixteen registers is replaced. Thus, in the same case as the second embodiment, the number of machine cycles in the third embodiment is sixteen.

A description will now be given of a fourth embodiment of the present invention with reference to FIGS. 14 and 15.

FIG. 14 shows a structure of an integrated circuit including a CPU according to the fourth embodiment of the present invention. In FIG. 14, those parts which are the same as those shown n FIG. 11 are given the same reference numbers.

In FIG. 14, the CPU 112 is provided with a register set 114 having registers R0 through Rn, a first CBNR 4 and a second CBNR 113. The first CBNR 4 stores first address pointing data $R_p$ indicating a leading position of a register set area in the register-file ROM 115a. The second CBNR 113 stores second address pointing data $R_{p'}$ indicating a leading position of a register set area in the register-file RAM 115b. The first and second CBNRs 4 and 113 can be formed in the register set 114.

Figure 15:
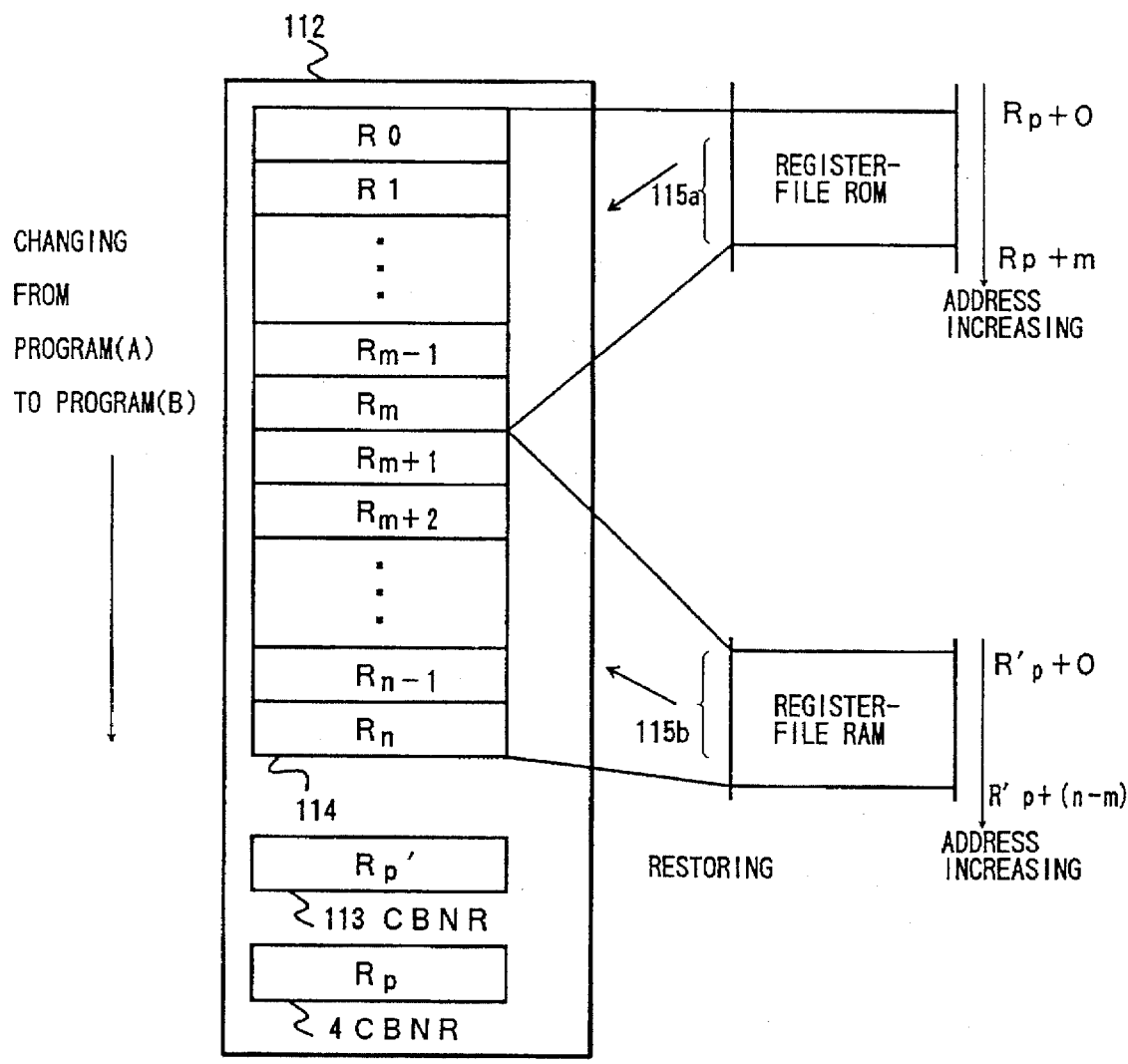
FIG. 15 is a diagram illustrating a process for replacing data stored in a register set shown in FIG. 14.

An address mapping of the register-file memory 115 is formed as shown in FIG. 15. A first register set area which is in a range of addresses $(R_p+0)$–$(R_p+m)$ is set in the register-file ROM 115a. The first register get area in the register-file ROM 115a can be accessed based on the first address pointing data $R_p$ stored in the first CBNR 4. A second register set area which is in a range of addresses $(R_{p'}+0)$–$(R_{p'}+n-m)$ is set in the register-file RAM 115b. The second register set area in the register-file RAM 115b can be accessed based on the second address pointing data $R_{p'}$ stored in the second CBNR 113. The addresses $(R_p+0)$ through $(R_p+m)$ in the register-file ROM 115a respectively correspond to registers R0 through Rm in the register set 114 in the CPU 112. The addresses $(R_{p'}+0)$ through $(R_{p'}+n-m)$ in the register-file RAM 115b respectively correspond to registers Rm+1 through Rn in the register set 114 in the CPU 112.

In the fourth embodiment of the present invention, the register changing time and processing time can be decreased in the same manner as those in the third embodiment. There is, further, the following advantage in the fourth embodiment.

The CPU 112 has the first CBNR 4 storing the first address pointing data $R_p$ used for identifying the first register set area in the register-file ROM 115a and the second CBNR 113 storing the second address pointing data $R_{p'}$ used for identifying the second register set area in the register-file RAM 115b. Thus, the first register area in the register-file ROM 115a and the second register area in the register-file RAM 115b can be independently accessed by the first and second address pointing data $R_p$ and $R_{p'}$. Thus, common data shared by a plurality of programs to be executed in the CPU can be stored in one area in the register-file ROM 115a. As a result, a capacity of the register-file ROM 115a can be decreased and a degree of freedom of address mapping in the register-file ROM 115a and the register-file RAM 115b can be improved.

As has been described above, in the above first through fourth embodiments, the CPU is provided with the register set for storing data used for executing a program in the CPU, and the register-file memory (RAM and/or ROM) is formed on an IC on which the CPU is formed. Due to using both the register set in the CPU end the register-file memory, the data stored in the register set in the CPU can be replaced and the process time can be improved also.

A description will now be given of a fifth embodiment of the present invention with reference to FIGS. 16 and 17.

Figure 16:
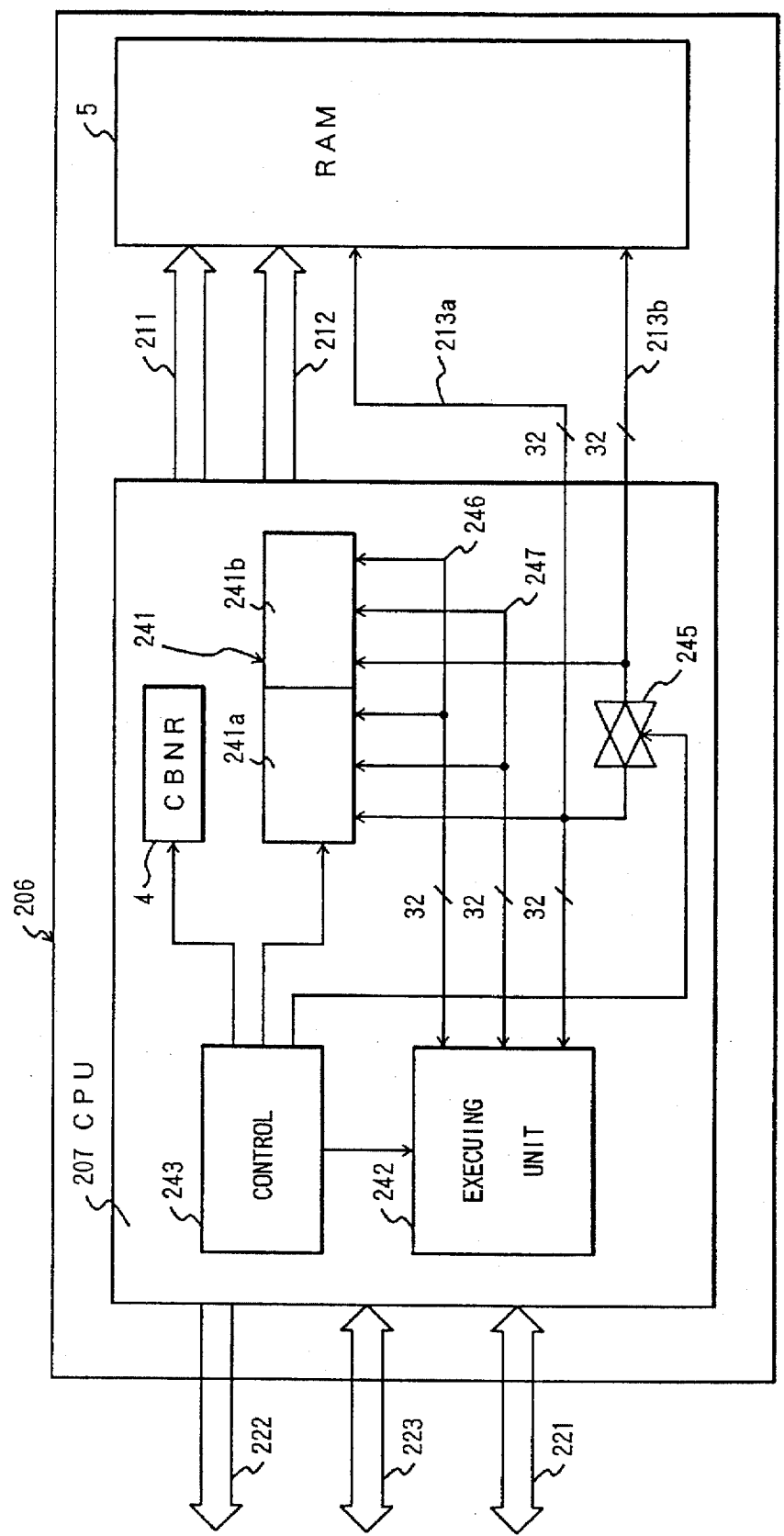
FIG. 16 is a block diagram illustrating an integrated circuit including a CPU according to a fifth embodiment of the present invention.

FIG. 16 shows a structure of an integrated circuit including a CPU according to the fifth embodiment of the present invention. In FIG. 16, those parts which are the same as those shown in FIG. 4 are given the same reference numbers.

Referring to FIG. 16, an integrated circuit 206 is provided with a CPU 207 and a register-file RAM 5. The CPU 207 is connected to the register-file RAM 5 by an internal bus. The internal bus is formed of a control bus 211, an address bus 212 and data buses 213a and 213b. The CPU 207 is connected to an external RAM by an exclusive bus separated from the internal bus. The exclusive bus is formed of a control bus 221, an address bus 222 and a data bus 223. The CPU 207 is provided with a register set 241, a CBNR 4, a executing unit 242, a control part 243. The register set 241 is formed of sixteen registers and divided into a first register set 241a having eight registers and a second register set 241b having eight registers. The executing unit 242 executes processes in accordance with various programs. The control part 243 controls elements in the CPU 206. The data bus connected to the register-file RAM 5 is connected to the executing unit 242 and the first register set 241 directly in the CPU 206. The data bus 213b is connected to the second register set 241b directly and to the fist register set 241a via a switch 245 in the CPU 206. The switch 245 is turned on by a control signal output from the control part 243, and data is transmitted Item the executing unit 242 to both the first and second register sets 241a and 241b via the data bus 213a and 213b. In this case, the executing unit 242 is connected to the register-file RAM 5 via both the data buses 213a and 213b. The switch 245 is turned off by a control signal output from the control part 243, and the register-file RAM 5 is connected to by the first and second register sets 241a and 241b. In this state, data stored in the register set 241 can be replaced during executing a program in the CPU 206.

The executing unit 242 is connected to the first and second register sets 241a and 241b by buses 246 and 247. The control part 243 supplies control signals to the CBNR 4, the register set 241 and the executing unit 242. The register-file RAM 5 has the single-port type construction.

A capacity of each of buses 213a, 213b 246 and 246 and register sets 241a and 241b is 32 bits.

Read/write operations in the CPU 207 is carried out as follows.

The CPU 207 reads data from the register set 241 via the buses 246 and 247. In a write operation, the switch 245 is turned on by the control signal output from the control part 243, and then updated data is stored in the first register set 241a via the data bus 241a and is stored in the second register set 241b via the switch 245. In this write operation, the same data as that stored in the register set 241 is stored in areas, in the register-file RAM 5, corresponding to the register sets 241a and 241b. The read/write operations are controlled by control signals output from the control part 243.

When a program to be executed in the CPU 207 is changed, the data stored in the register set 241 is replaced as follows.

In this case, the address pointing data stored in the CNBR 4 is replaced. Data stored in an area, in the register-file RAM 5, identified by the replaced address pointing data in the CNBR 4 is read out and stored in the register set 241 in the CPU 207. That is, a restoring process is carried out.

In the restoring process, the switch 245 is turned off by a control signal output from the control part 243, so that the register-file RAM 5 is independently connected to the first and second register sets 241a and 241b respectively via the data bus 213a and 213b. Than data stored in the register-file RAM 5 is read out and stored in the first and second register sets 241a and 241b. In this case, each of the data buses 213a and 213b has a capacity of 32 bits, 64 bit data is supplied from the register-file RAM 5 to the register set 241 by one operation. Since each of the first and second register sets 241a and 241b has eight registers, the data transmission from the register-file RAM 5 to the register set 241 can be completed by 8 machine cycles.

The following number of machine cycles is required for transmitting the data from the external RAM to the register set 241 via the data bus 223 in a case where a clock rage of the data buses 213a and 213b is as twice as that in the data bus 223 connected to the external RAM, and the data bus 223 has a capacity of 16 bits.

16×32÷16×2=64 (machine cycles), where 16 (first): the number of registers in the register set 241

32: the number of bits in each register 16 (second): the number of bits in the data bus 223

2: clock rate

Since 64 machine cycles also need to execute the saving process, the total number of machine cycles is (64×2).

On the other hand, in the above fifth embodiment of the present invention, 8 machine cycles are required for replacing the data in the register set as follows.

16×32÷64=8 (machine cycles), where

16: the number of registers in the register set 241

32: the number of bite in each register

64: the number of bits in the data bus

Thus, the register changing time can be decreased and the processing time can be improved.

A description will now be given of a pipeline processing carried out in the integrated circuit 206 including the CPU 207. The register set 241 has the triple-port type construction.

Figure 17:
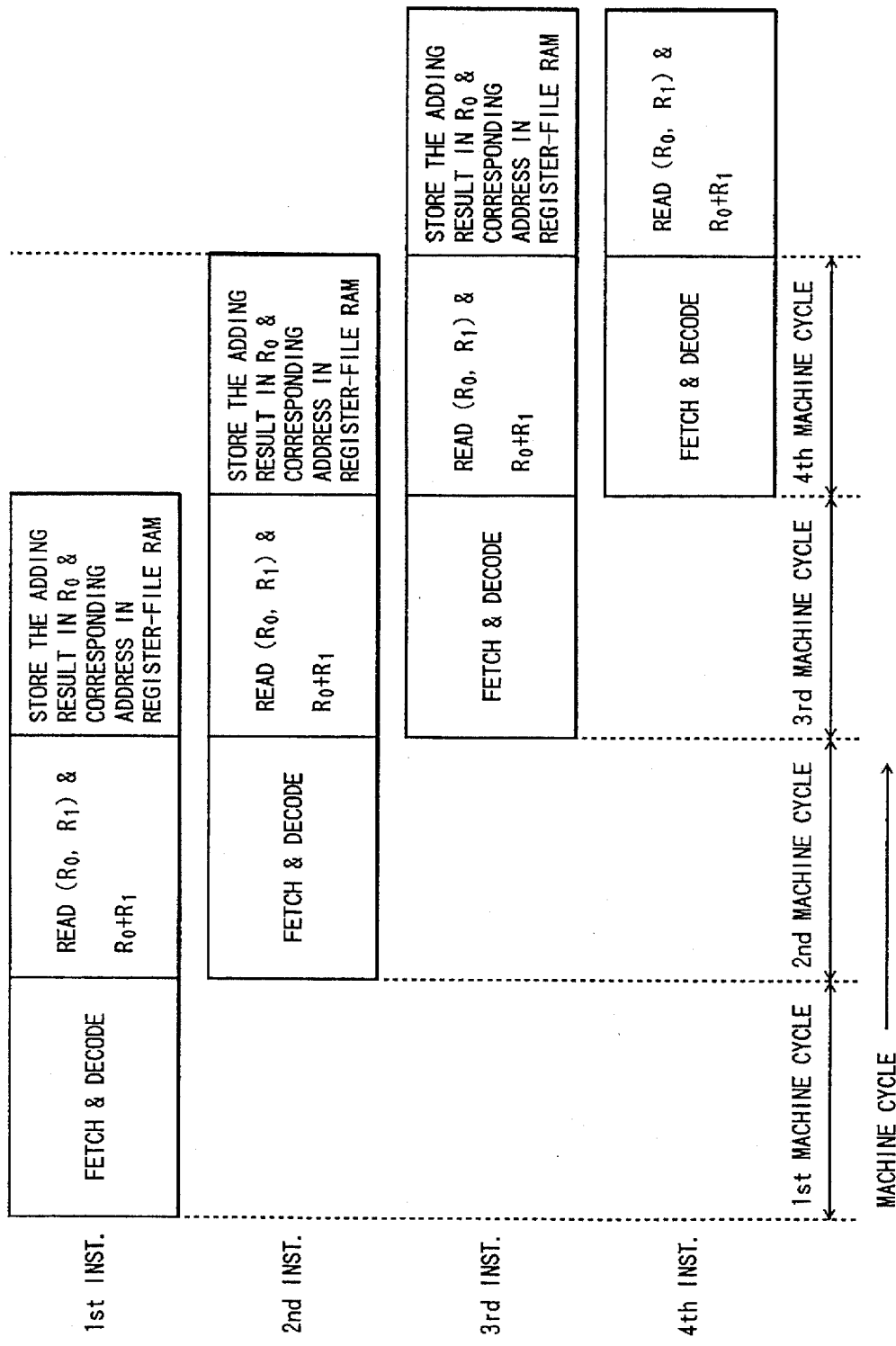
FIG. 17 is a timing chart illustrating four instructions executed in the CPU shown in FIG. 16.

FIG. 17 shows machine cycles in a case where the following instruction is repeated four times.

INSTRUCTION (1) Add data stored in a register R1 from among the registers R0 through R15 in the register set 241 to data stored in a register R0.

(2) Store the adding result in the register R0.

Referring to FIG. 17, periods in a transverse axis respectively indicate machine cycles. A first instruction is executed in three machine cycles as follows. The first instruction is fetched and decoded in a first machine cycle. Since the register-set 241 in the CPU 207 has the triple-port type construction, read operations of registers R0 and R1 and an adding operation (R0+R1) are simultaneously carried out in a second machine cycle. The adding result obtained in the second machine cycle is stored in both the register R0 in the register-set 241 and a corresponding address in the register-file RAM 5 in a third machine cycle.

The second, third and fourth instructions are executed in three machine cycles in the same manner as the first instruction. After operations of the first instruction is completed in the first machine cycle, an instruction reading part of the CPU 207 becomes a condition in which an instruction can be fetched. Thus, while operations of the first instruction is carried out in the second machine cycle, a fetch operation and a decoding operation of the second instruction are carried out. That is, in the second machine cycle, operations of both the first and second instructions are simultaneously carried out. After arithmetic of the first instruction is completed in the second machine cycle, an arithmetic part of the CPU 207 can carries out an arithmetic. Thus, while operations of the first instruction are carried out in the third machine cycle, a reading operation of the registers R5 and R7 and the arithmetic (R0+R1) of the second instruction are carried out. Further, since the buses 221, 222 and 223 connecting the CPU 207 to the external RAM is separated from the internal bus connecting the CPU 207 to the register-file RAM 5, and the register-set 241 in the CPU 207 has the triple-port type construction, while the operations of the first instruction are carried out in the third machine cycle, a fetch operation and a decoding operation of the third instruction are carried cut also. That is, the operations of the first, second and third instructions are simultaneously carried out in the third machine cycle. As operations of a plurality of instructions are simultaneously carried out in each machine cycle, as described above, one instruction can be apparently carried out in one machine cycle.

The register-file RAM 5 is accessed in only a case where the arithmetic result is stored therein. That is, one access with respect to the register-file RAM 5 is carried out in one machine cycle. Thus, the register-file RAM does not need to have a dual-port type or a triple-port type construction, but may have a single-port type construction capable of accessing only one address in one operation. As a result, a large amount of internal bus and a complex circuit for controlling the register-file RAM are not needed, and the amount of hardware is prevented from increasing. In addition, the above pipeline operation can be executed at a high speed.

According to the fifth embodiment of present invention, the register set 241 provided in the CPU 7 is divided into the first and second register sets 241a and 241b, the first and second register sets 341a and 241b are respectively connected the register-file RAM 5 by the buses 213a and 213b, and the data stored in the register set 241 is replaced by only the restoring process without performing the saving process. Thus, a processing time in the CPU 207 can be improved. In addition, the external bug connecting the CPU 207 to the external bus is separated from the internal bus connecting the CPU 207 to the register-file RAM 5, so that a process for accessing the external RAM and a process for accessing the register-file RAM 5 can be independently carried out. Further, while the restoring process for replacing the data in the register set 241 is carried out, the external bus (221, 222 and 223) is not used, so that a fetch operation with respect to the next instruction can be performed. The CPU 207 can carry out operations.

In the above embodiment, the CPU is provided with the register set, and a system for accessing the register-file RAM and a system for accessing the external RAM are separated from each other. Thus, in a step for designing the IC, it can be selected whether or not the system for accessing the register-file RAM is formed on the IC. If it is selected that the system for accessing register-file RAM is not formed on the IC, the IC is not provided with the register-file RAM and the internal bus. In this case, the IC has the same structure as the conventional IC shown in FIG. 1. On the other hand, if it is selected that the system for accessing the register-file RAM is formed on the IC, the IC is provided with the register-file RAM and the internal bus connecting the CPU to the register-file RAM. In this case, the IC described in each of the above embodiment is obtained.

That is, an IC having a structure required by users can be quickly manufactured.

A switch for connecting and disconnecting the register-file RAM to and from the internal bus (the control bus 211, the address bus 212 and the data buses 213a and 231b) and a control unit for controlling on and off operation of the switch can be provided in the IC. In this case, an IC having a high versatility can be obtained.

A plurality of register sets can be provided in the CPU.

The present invention is not limited to the aforementioned embodiments, and variations and modifications may be made without departing from the scope of the claimed invention.

What is claimed is:

1. An integrated circuit comprising:
a central processing unit for executing a plurality of programs, said central processing unit having a register set configured to store first data required for executing one of said plurality of programs in said central processing unit, said register set formed of a plurality of registers; and
a register file independent of and coupled to said central processing unit through a bus internal to said integrated circuit, said register file configured to store second data including at least said first data stored in said register set in said central processing unit, said register file including a single-port type random access memory (RAM), wherein:
said second data stored in said register file is selectively supplied to said register set in said central processing unit,
said register file is formed of a plurality of register-file areas, each of said plurality of register-file areas having an address respectively corresponding to one of said plurality of registers in said register set in said central processing unit, and
said central processing unit is connected to a memory external to said integrated circuit by an external bus.

2. An integrated circuit as claimed in claim 1, wherein said register file stores a plurality of data sets, each of said plurality of data sets being required for executing a corresponding one of said plurality of programs in said central processing unit, and wherein a data set corresponding to said one of said plurality of programs to be executed in said central processing unit is read out from said register file and stored in said register set.

3. An integrated circuit as claimed in claim 1, wherein said central processing unit is further provided with a register for storing address pointing data used for identifying a register-file area in said register file.

4. An integrated circuit as claimed in claim 1, wherein, when data stored in said register set is updated, corresponding data stored in said register file is updated.

5. An integrated circuit as claimed in claim 1, wherein said register set comprises a dual-port type register set.

6. An integrated circuit as claimed in claim 1, wherein said register set comprises a triple-port type register set.

7. An integrated circuit comprising:
a central processing unit for executing a plurality of programs, said central processing unit having a register set configured to store data required for executing one of said plurality of programs in said central processing unit, said register set including a first part for storing data shared by said plurality of programs and a second part for storing data required for said one of said plurality of programs, and said register set being formed of a plurality of registers such that each of said first and second parts of said register set is formed of a plurality of registers; and
a register file independent of and coupled to said central processing unit through a bus internal to said integrated circuit, said register file configured to store at least said data stored in said second part of said register set in said central processing unit, and said register file being comprised of a single-port type random access memory (RAM), wherein:
data stored in said register file is selectively supplied to said second part of said register set in said central processing unit,
said register file is formed of a plurality of register-file areas, each of said plurality of register-file areas having an address respectively corresponding to one of said plurality of registers in said second part of said register set in said central processing unit.

8. An integrated circuit as claimed in claim 7, wherein said register file stores a plurality of data sets, each of said plurality of data sets being required for executing a corresponding one of said plurality of programs in said central processing unit, and
a data set corresponding to said one of said plurality of programs to be executed in said central processing unit is read out from said register file and stored in said register set.

9. An integrated circuit as claimed in claim 7, wherein said central processing unit is further provided with a register for storing address pointing data used for identifying a register-file area in said register file.

10. An integrated circuit as claimed in claim 7, wherein said central processing unit is connected to an external device provided outside of said integrated circuit by a bus other than said internal bus.

11. An integrated circuit as claimed in claim 7, wherein, when data stored in said second part of said register set is updated, corresponding data stored in said register file is updated.

12. An integrated circuit as claimed in claim 7, wherein said register set comprises a dual-port type register set.

13. An integrated circuit as claimed in claim 7, wherein said register set comprises a triple-port type register set.

14. An integrated circuit comprising:
a central processing unit for executing a plurality of programs, said central processing unit having a register set configured to store first data required for executing one of said plurality of programs in said central processing unit, said register set formed of a plurality of registers; and
a register file independent of and coupled to said central processing unit through a bus internal to said integrated circuit, said register file configured to store second dam including at least said first dam stored in said register set in said central processing unit, said register file having a first part for storing data shared by said plurality of programs and a second part for storing data individually used for executing each of said plurality of programs in said central processing unit, wherein:
data stored in said first and second parts of said register file is selectively supplied to said register set in said central processing unit,
each of said first and second parts has a plurality of register-file areas, each of said plurality of register-file areas having an address respectively corresponding to one of said plurality of registers in said register set in said central processing unit, and
said first part of said register file is comprised of a read only memory (ROM) and said second part of said register file is comprised of a single-port type random access memory (RAM).

15. An integrated circuit as claimed in claim 14, wherein a data set corresponding to said one of said plurality of programs to be executed in said central processing unit is read out from said first and second parts of said register file and stored in said register set.

16. An integrated circuit as claimed in claim 14, wherein said central processing unit is further provided with a register for storing address pointing data used for identifying a pair of register-file areas in said first and second parts of said register file.

17. An integrated circuit as claimed in claim 14, wherein said central processing unit is further provided with a first register for storing first address pointing data used for identifying a register-file area in said first part of said register file and a second register for storing second address pointing data used for identifying a corresponding register-file area in said second part of said register file.

18. An integrated circuit as claimed in claim 14, wherein said central processing unit is connected to an external device provided outside of said integrated circuit by a bus other than said internal bus.

19. An integrated circuit as claimed in claim 14, wherein, when data stored in said register set is updated, corresponding data stored in said second part of said register file is updated.

20. An integrated circuit as claimed in claim 14, wherein said register set comprises a dual-port type register set.

21. An integrated circuit as claimed in claim 14, wherein said register set comprises a triple-port type register set.

22. An integrated circuit comprising:
a central processing unit for executing a plurality of programs, said central processing unit having a plurality of register sets each including a plurality of registers, at least one of said plurality of register sets configured to store first data required for executing one of said plurality of programs in said central processing unit;
a register file independent of and coupled to said central processing unit, said register file configured to store second data including said first data stored in said at least one of said plurality of register sets in said central processing unit, said register file including a plurality of register-file areas, each of said plurality of register-file areas respectively corresponding to a register set from said plurality of register sets in said central processing unit, and said register fie being comprised of a single-port type random access memory (RAM);
a bus internal to said integrated circuit coupling said register set to said register file; and
a switching circuit coupled to said internal bus for selectively supplying said second data stored in said register file to said register set in said central processing unit via said internal bus.

23. An integrated circuit as claimed in claim 22, wherein said central processing unit is further provided with a register for storing address pointing data used for identifying a register-file area in said register file.

24. An integrated circuit as claimed in claim 22, wherein said central processing unit is connected to an external device provided outside of said integrated circuit by a bus other than said internal bus.

25. An integrated circuit as claimed in claim 22, wherein, when data stored in said plurality of register sets is updated, corresponding data stored in said register file is updated.

26. An integrated circuit as claimed in claim 22, wherein each of said plurality of register sets includes a dual-port type register set.

27. An integrated circuit as claimed in claim 22, wherein each of said plurality of register sets includes a triple-port type register set.

28. An integrated circuit comprising:
a central processing unit (CPU) for executing a plurality of programs, said CPU including a register set for storing execution data required for executing one of said plurality of programs in said CPU, said register set having a triple-port type construction and being comprised of sixteen registers;
a register-file RAM having a single-port type construction, said register-file RAM including a plurality of register-set areas;
an internal bus formed on said integrated circuit connecting said CPU with said register-file RAM, said internal bus including an address bus, a data bus, and a control bus, wherein:
said execution data is stored in said register set and in a predetermined register-set area in said register-file RAM,
said CPU reads said execution data from said register set and writes updated data into an accessed register in said register set and into a corresponding address in said register-set area, said CPU further includes a current-bank-number-register (CBNR) for storing address pointing data for indicating a leading position of said predetermined register-set area in said register-file RAM storing said execution data, addresses in each register-set area in said register-file RAM respectively correspond to each of said sixteen registers in said register set, and said CPU is connected to a memory external to said integrated circuit by an external bus.

29. An integrated circuit comprising:

a central processing unit (CPU);

a register-file RAM having a single-port type construction;

an internal bus formed on said integrated circuit connecting said CPU with said register-file RAM, said internal bus including an address bus, a data bus, and a control bus;

a register set provided in said CPU, said register set having a triple-port type construction, and said register including a global register set having at least one register and a local register set having at least one register; and a current-bank-number-register (CBNR) provided in said CPU for storing address pointing data, wherein:

common data shared by a plurality of programs to be executed in said CPU is stored in said global register set, said local register set is used to store data required for executing a program in said CPU, said CPU carries out a read operation with respect to said global register set and said local register set; and said CPU writes updated common data in only said global register set, and writes updated data both in said local register set and a corresponding register-set area in said register-file RAM.

30. An integrated circuit comprising:

a central processing unit (CPU);

a register-file memory including a register-file read only memory (ROM) and a register-file random access memory (RAM), said register-file RAM formed of a single-port type construction;

an internal bus formed on said integrated circuit connected said CPU with said register-file memory;

a register set provided in said CPU, said register set having a triple-port type construction, and said register set including a plurality of registers; and a current-bank-number-register (CBNR) provided in said CPU for storing address pointing data, wherein:

a first portion of said plurality of registers in said register set corresponds to said register-file RAM and a second portion of said plurality of registers in said register set corresponds to said register-file ROM, and said CPU writes updated data in both an identified register in said first portion of said register set and a corresponding address in said register-file RAM.

* * * * *